United States Patent
Tomita et al.

(10) Patent No.: US 6,879,563 B1
(45) Date of Patent: Apr. 12, 2005

(54) DATA REPEATER AND MULTIPLEX COMMUNICATION SYSTEM USING THE SAME

(75) Inventors: Kenji Tomita, Toyohashi (JP); Ikuo Hayashi, Okazaki (JP); Yoshihisa Sato, Nagoya (JP); Toshihiro Wakamatsu, Kariya (JP); Tomohisa Kishigami, Obu (JP); Kazunori Sakai, Nishikamo-gun (JP); Masachika Kamiya, Toyota (JP); Hiroshi Honda, Okazaki (JP); Masato Kume, Toyota (JP); Mikito Yagyu, Toyota (JP)

(73) Assignees: Nippon Soken, Inc., Nishio (JP); Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/505,704

(22) Filed: Feb. 17, 2000

(30) Foreign Application Priority Data

Feb. 18, 1999 (JP) ............................................. 11-039451
Feb. 18, 1999 (JP) ............................................. 11-039560

(51) Int. Cl.$^7$ ............................................. H04L 12/56
(52) U.S. Cl. ............... 370/246; 370/395.42; 370/395.7; 370/401
(58) Field of Search ........................ 370/395.42, 395.43, 370/412, 395.7, 395.71, 226, 243, 246, 401

(56) References Cited

U.S. PATENT DOCUMENTS

| | | | |
|---|---|---|---|
| 4,896,261 A | | 1/1990 | Nolan |
| 4,942,571 A | * | 7/1990 | Moller et al. ............... 370/407 |

(Continued)

FOREIGN PATENT DOCUMENTS

| | | |
|---|---|---|
| JP | A-H03-16448 | 1/1991 |
| JP | 5-48618 | 2/1993 |
| JP | 6-189377 | 7/1994 |
| JP | 7-222257 | 8/1995 |
| JP | 9-27821 | 1/1997 |
| JP | A-H10-247948 | 9/1998 |

OTHER PUBLICATIONS

Peha and Tobagi, "Implementation Strategies for Scheduling Algorithms in Integrated–Services Packet–Switched Networks," Countdown to the New Millennium, Phoenix, Dec. 2–5, 1991, Proceedings of the Global Telecommunications Conference (Globecom), New York, IEEE, US, vol. 3, Dec. 2, 1991, pp. 1733–1740.

(Continued)

*Primary Examiner*—John Pezzlo
*Assistant Examiner*—D Levitan
(74) *Attorney, Agent, or Firm*—Posz Law Group, PLC

(57) ABSTRACT

A multiplex communication system having a data repeater, which can prevent data from being lost so as to improve reliability of data communication, when a data repeater of a multiplex communication system repeats data. A multiplex communication system is made up of a plurality of communication groups including a plurality of communication lines and a data repeater. The data repeater is made up of receiving buffers, sending buffers, a data controller and a transfer-address table. The data controller selects multiplex communication lines through which the received data is to be repeated and transfers the received data thereto. The data controller has a priority-reset means for increasing a priority of a received data before being sent. The priority-reset means prioritizes a sending of the data from the data repeater, even if the data sent from the data repeater collides with the other data on the multiplex communication lines through which the received data is to be repeated. In this way, the priority-reset means prevents the data waiting for being sent in the data repeater from being lost by being overwritten with newly received data.

7 Claims, 26 Drawing Sheets

U.S. PATENT DOCUMENTS

| | | | | |
|---|---|---|---|---|
| 5,309,436 A | * | 5/1994 | Hirano et al. | 370/447 |
| 5,379,292 A | | 1/1995 | Kurata et al. | |
| 5,392,285 A | * | 2/1995 | Kurts | 370/407 |
| 5,499,238 A | * | 3/1996 | Shon | 370/399 |
| 5,551,053 A | | 8/1996 | Nadolski et al. | |
| 5,729,755 A | | 3/1998 | Turski | |
| 5,850,399 A | * | 12/1998 | Ganmukhi et al. | 370/412 |
| 5,963,560 A | * | 10/1999 | Kalkunte | 370/448 |
| 6,188,686 B1 | * | 2/2001 | Smith | 370/388 |
| 6,487,202 B1 | * | 11/2002 | Klausmeier et al. | 370/395.1 |
| 6,504,845 B1 | * | 1/2003 | Petersen et al. | 370/412 |

OTHER PUBLICATIONS

William D. Horne, et al., "Application of In–Vehicle Data Buses for Collision Avoidance Systems" Intelligent Transportation System, 1997. ITSC '97, *IEEE Conference of Boston, MA, U.S.A.* Nov. 9–12, 1997, pp. 433–438.

* cited by examiner

FIG. 1
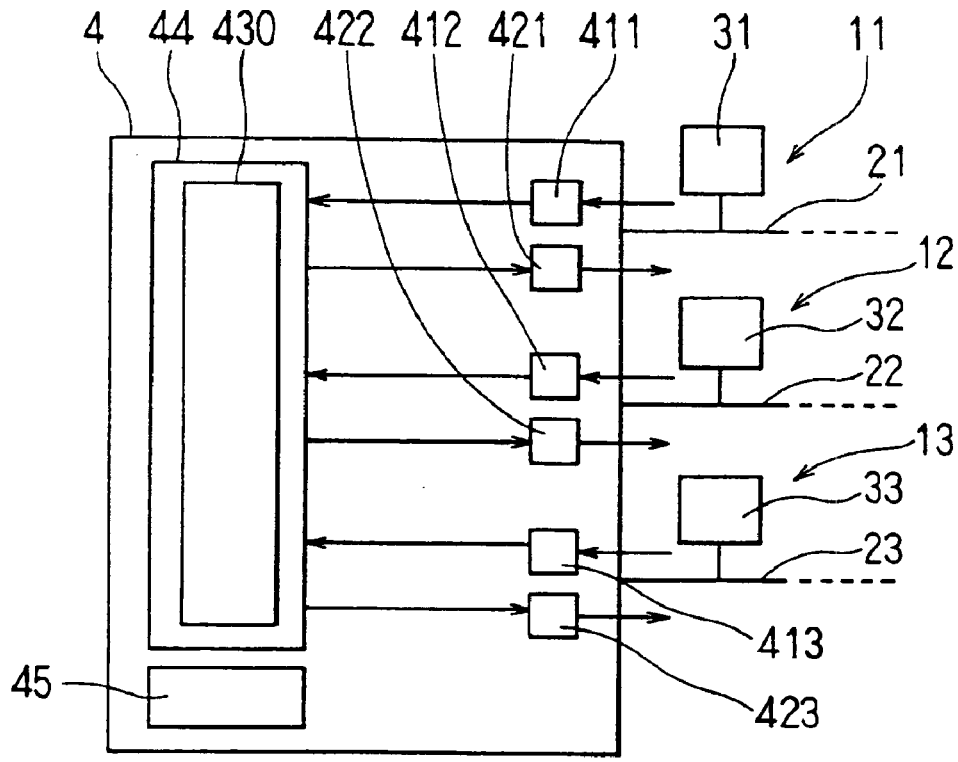
FIG. 2
| SOF | PRI | ML | DID | MID | DATA | CRC | EOM | RSP | EOF |
FIG. 3
| KIND OF DATA | MID |
|---|---|
| ENGINE REVOLUTIONS | 08h |
| VEHICLE SPEED | A5h |
| CONDITION OF PW/SW | DDh |

| | MID | FIRST MULTIPLEX COMM LINE | SECOND MULTIPLEX COMM LINE | THIRD MULTIPLEX COMM LINE |
|---|---|---|---|---|
| DATA V | 01h | 0 | 1 | 0 |
| DATA W | 5Fh | 0 | 0 | 1 |
| DATA X | 92h | 1 | 0 | 0 |
| DATA Y | C8h | 1 | 1 | 0 |
| DATA Z | EBh | 0 | 1 | 1 |

| KIND OF DATA | MID |
|---|---|
| ENGINE REVOLUTIONS | 08h |
| VEHICLE SPEED | A5h |
| CONDITION OF PW/SW | DDh |

|  | MID | FIRST MULTIPLEX COMM LINE | SECOND MULTIPLEX COMM LINE | THIRD MULTIPLEX COMM LINE |
|---|---|---|---|---|
| DATA V | 01h | 0 | 1 | 0 |
| DATA W | 5Fh | 0 | 0 | 1 |
| DATA X | 92h | 1 | 0 | 0 |
| DATA Y | C8h | 1 | 1 | 0 |
| DATA Z | EBh | 0 | 1 | 1 |

| SENDING ORDER | MID |
|---|---|
| 1 | C8h |
| 2 | 01h |

| SENDING ORDER | MID |
|---|---|
| 1 | 01h |

| SENDING ORDER | MID |
|---|---|
| 1 | 01h |
| 2 | EBh |

FIG. 33A

| SENDING ORDER | MID | PRIORITY |
|---|---|---|
| 1 | C8h | 1101b |
| 2 | 01h | 0011b |

FIG. 33B

| SENDING ORDER | MID | PRIORITY |
|---|---|---|
| 1 | C8h | 1101b |
| 2 | EBh | 1000b |
| 3 | 01h | 0011b |

FIG. 33C

| SENDING ORDER | MID | PRIORITY |
|---|---|---|
| 1 | C8h | 1101b |
| 2 | 01h | 0011b |
| 3 | EBh | 0000b |

FIG. 35

| | MID | FIRST MULTIPLEX COMM LINE | SECOND MULTIPLEX COMM LINE | THIRD MULTIPLEX COMM LINE |
|---|---|---|---|---|
| DATA V | 01h | 0 | 1 <br> 0011 | 0 |
| DATA W | 5Fh | 0 | 0 | 1 <br> 1001 |
| DATA X | 92h | 1 <br> 0010 | 0 | 0 |
| DATA Y | C8h | 1 <br> 0110 | 1 <br> 1101 | 0 |
| DATA Z | EBh | 0 | 1 <br> 1000 | 1 <br> 1100 |

DATA REPEATER AND MULTIPLEX COMMUNICATION SYSTEM USING THE SAME

CROSS REFERENCE TO RELATED APPLICATION

This application is based upon Japanese Patent Application Nos. Hei. 11-39451 filed on Feb. 18, 1999, and Hei. 11-39560 filed on Feb. 18, 1999, the contents of which are incorporated herein by reference.

BACKGROUND OF THE INVENTION

1. Field of the Invention

The present invention relates to data repeaters, and particularly to a data repeater for repeating plural data types, and a multiplex communication system using the same.

2. Related Art

Recently, data communication has become more sophisticated particularly in the area of computer technology. In the automotive field, for example, an amount of data communicated within a control portion for controlling electrical equipments to be mounted on the vehicle has rapidly increased. Therefore, a multiplex communication system must be applied in order to reduce the number of wire harnesses for transmitting the data. The communication system performs data communication via a multiplex communication lime between communication nodes; by connecting the communication nodes such as a controlling Electronic Control Unit (ECU) for sending or receiving data to a common multiplex communication line. The data is constructed by containing information such as type of the data in addition to primary data. In the case of a vehicle in which the number of types of control is large, a plurality of communication groups, each of which is made up of a multiplex communication line and a node to be connected to this communication line, is provided based on a difference in a communication speed to be required in order to effectively perform the data communication. The communication between nodes whose communication groups are different from each other is performed via a data repeater.

FIG. 37 shows such a multiplex communication system having a plurality of communication groups. A data repeater 8 of the multiplex communication system has receiving buffers 811, 812, 813 and sending buffers 821, 822, 823 individually provided to each multiplex communication lines 61, 62, 63 of communication groups 51, 52, 53, and a data controller 83. In the case where data transferred to one of the communication groups 51–53 is different from the communication groups 51–53 to which a communication node 71, 72, 73 having sent the data belongs, the multiplex communication system operates as follows. That is, data sent from the communication node 71 connected to the first multiplex communication line 61 to the communication node 72 connected to the second multiplex communication line 62 is rewritten to the receiving buffer 811 for the first multiplex communication line in the data repeater 8. The data controller 83 obtains information that the data should be sent from the receiving buffer 811 to the second multiplex communication line 62. The data in the receiving buffer 811 is transferred to the sending buffer 822 for the second multiplex communication line. The data transferred to the sending buffer 822 is sent to the second multiplex communication line 62 at a predetermined timing (First prior art).

Furthermore, as shown in FIG. 38, receiving buffers 811$a$, 811$b$ for the first multiplex communication line, receiving buffers 812$a$, 812$b$ for the second multiplex communication line, receiving buffers 813$a$, 813$b$ for the third multiplex communication line, sending buffers 821$a$, 821$b$ for the first multiplex communication line, sending buffers 822$a$, 822$b$ for the second multiplex communication line, and sending buffers 823$a$, 823$b$ for the third multiplex communication line are respectively connected in serial in the data repeater so that these buffers are used as an FIFO (First In First Out) type. The data repeater 8A, can hold a large amount of data by waiting to send data even when the data received early is stacked in the last sending buffers 821$b$–823$b$ (Second prior art).

However, even if the data remains at the sending buffer, other data to be transferred is sent to the data repeater regardless of such a situation. Therefore, in the case the receiving buffer receives the data when the receiving buffer has data already written therein, the data in the receiving buffer is overwritten by the newly received data so that the previously existing data is lost. In this case, it would be not problem when the previously written data is overwritten by the same type of data so as to be updated. However, it is problem when the data is overwritten by another type of data because certain type of data is completely lost.

According to the second prior art, there are some spare buffers compared to the first prior art because the number of the receiving buffers and the sending buffers is larger than that of the first prior art. However, when the sending to the multiplex communication line from the sending buffer is delayed because the multiplex communication line to be sent is busy, the data is ultimately lost, and therefore a reliability of data communication decreases. Here, it might be thought to considerably increase the number of receiving buffers or the sending buffers to be arranged in serial in the second prior art. However, the construction becomes complicated and it leads to an increase of overall system cost.

SUMMARY OF THE INVENTION

The present invention has been conceived in view of the above-described background, and its first object is to provide a data repeater and a multiplex communication system having sufficient data communication reliability.

Its second object is to provide a data repeater and a multiplex communication system having sufficient data communication reliability with simple structure.

According to one aspect of the present invention, priority-reset means for resetting the priority of the received data to a priority higher than a predetermined priority before transferring is provided to a data controller for selecting one of the multiplex communication line that repeats received data and for transmitting the received data thereto.

Since the data sent from the data repeater having a high priority, a sending of a repeating data is prioritized based on an increase of the priority even if data are collided with each other on the multiplex communication line that repeats the data. Therefore, it can reduce the overwriting of the data waiting for being sent with the newly received data.

Here, the priority to be reset by the priority-reset means may be set to a constant priority higher than priorities of any other data to be sent to the multiplex communication line. Furthermore, the priority-reset means may be prospectively provided to each multiplex communication line through which the received data is to be repeated, and the priority to be reset by the priority-reset means may be set to a constant priority higher than priorities of any other data to be sent to the multiplex communication line that repeats the received data. In these cases, a sending of the data having the highest priority is prioritized without delaying whichever multiplex communication line the data may collide with each other. Therefore, it can prevent the data waiting for being sent from being overwritten by the newly received data.

According to another aspect of the present invention, a plurality of buffers for temporally storing received data before sending the received data to the multiplex communication line through which the received data is to be repeated, are provided with respect to every data type; and the data controller is provided with buffer assign means for recognizing the data type of the received data, and for assigning one of the buffers corresponding the data type as a target buffer in which the received data is to be written.

By providing the buffers with respect to every data type, the buffers are capable of overwriting the data only by the same data type new data, and of prohibiting overwriting the data by different type data. Furthermore, this can be achieved by a simple structure, because the number of the buffers is enough to be the number of the data types to be repeated.

Here, the data controller may be constructed so that an order of ascertaining the buffers is successively shifted every starting up. By sequentially ascertaining the existence of data in the buffers, an existence of data to be sent in the buffers can be accurately recognized.

Here, the data controller may be constructed so that an order of ascertaining the buffers is successively shifted every starting up. In this case, it can average time needed for repeating the data among the buffers, because the order of the ascertaining is not fixed.

Furthermore, a sending data list may be provided with respect to every multiplex communication line, the sending data list stores information about the data types to be sent with sorting in sending order; and the data controller may be provided with list update means for adding information about the data type of the received data to the sending data list. The data can be immediately repeated, because the data type to be sent in the buffers can obtained by the sending data lists without ascertaining the existence of the data for all buffers.

Furthermore, the list update means may add the information about the data type of the received data to the sending data list so that an order in the sending data list is equal to an order of receiving of the data. All of the received data can be accurately sent without delaying, because an order in the sending data list becomes equal to an order or receiving of the data.

Here, the data may include information about a priority, which is determined depending on the data type, for preventing a data collision on the multiplex communication line; and the list update means may recognize the priority of the received data and adds the information about the data type of the received data to the sending data list so that an order in the sending data list is equal to an order of priorities of the received data. In this case, it can prevent a sending of the data having a high priority from being delayed, because an order in the sending data list becomes equal to an order of priorities of the received data.

Furthermore, a priority table for bringing the priority of the data into correspondence with the data types to be repeated maybe provided; and the list update means may recognize the priority of the received data based on the priority table and may add the information about the data type of the received data to the sending data list so that an order in the sending data list is equal to an order of priorities of the received data. In this case, it can prevent a sending of the data having a high priority from being delayed, because an order in the sending data list becomes equal to an order of priorities of the received data.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 1 is a diagram of a structure of a data repeater and a multiplex communication system of a first embodiment according to the present invention;

FIG. 2 is a diagram illustrating a frame of communication data of the data repeater and the multiplex communication system of the first embodiment;

FIG. 3 is a diagram illustrating a relationship between type of the communication data of the data repeater and the multiplex communication system and an MID thereof of the first embodiment;

FIGS. 33A, 33B and 33C are diagrams illustrating relationships among sending orders, data types and priorities in a sending data list of the data repeater of the sixth embodiment;

FIG. 35 is a diagram illustrating relationships among data, transfer-addresses and priorities in a transfer-address table of the fifth data repeater of the seventh embodiment;

Figures 4, 5:
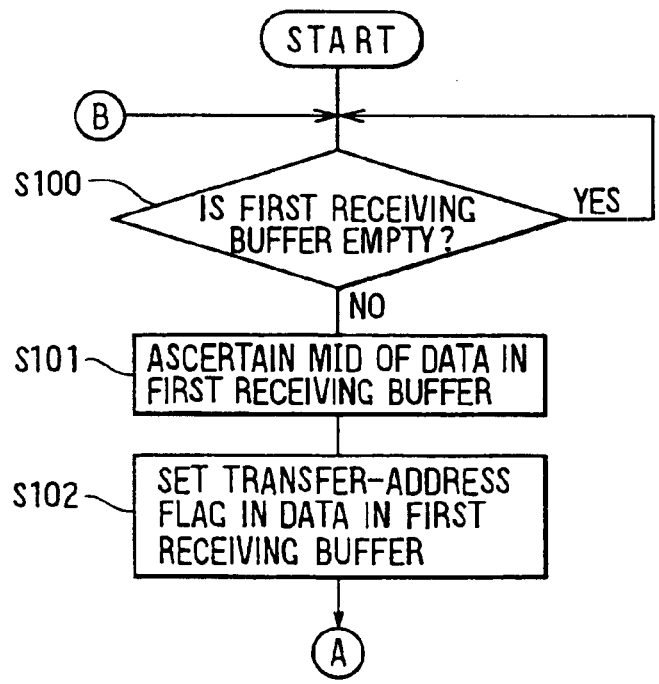
FIG. 4 is a diagram illustrating a relationship between data in a transfer-address table of the data repeater and a transfer address thereof of the first embodiment.
FIG. 5 is a first flowchart illustrating a control executed in a data controller of the data repeater of the first embodiment.

DESCRIPTION OF THE PREFERRED EMBODIMENTS (First embodiment)

FIG. 1 shows a data repeater and a multiplex system according to the present invention. The multiplex communication system is made up of a plurality of (three in figure) communication groups 11, 12, 13, and a data repeater 4. Each of the communication groups 11–13 is constructed by connecting communication nodes 31, 32, 33 to multiplex communication lines 21, 22, 23, and performs sending and receiving of data among the communication nodes 31–33, based on a predetermined protocol. At least one of the communication nodes 31–33 belongs each of the communication group 11–13.

FIG. 2 shows an example of a frame structure of the above-described data. This is a frame structure based on the BEAN (Body Electronics Area Network) protocol of vehicle. Here, data communication described hereinafter is assumed to follow this BEAN protocol. SOF (Start Of Frame) means a start of a frame, and is assigned 1 bit. PRI (Priority) is an area showing priority of the frame, and is assigned 4 bits. The priority of "1" is higher than that of "0". When data are collected each other on the multiplex communication lines 21–23 in each of the communication groups 11–13, the data repeater 4 and the communication nodes 31–33 prioritize the data having high priority and stop sending the other data. ML (Message Length) is an area showing a length of following message portion, and has length of the number of byte of DATA plus two, because DID and MID both of which construct the message portion respectively have 1 byte as described later and because the DATA has a variable length.

First portion of the message portion is the DID (Destination ID), and is an area showing a destination address node ID of the frame. The MID (Message ID) is an area showing a message ID, and is assigned 8 bits. The MID is given to individual types of data, and specifies the type of data shown by contents of the DATA described later. There is the number of engine revolutions or the like as the type of data communicated by communication. As shown FIG. 3, the MID is given to each of the data, for example. When it is explained using this figure, DATA of the communication data where MID=08h shows the number of the engine revolutions, DATA of the communication data where MID=A5h shows vehicle speed, and DATA of the communication data where MID=DDh shows a condition of power window switch. The DATA are assigned within 1 to 11 byte in area of the main data.

After the DATA, CRC (Cyclic Redundancy Characters), EOM (End of Message) and RSP (Response) are followed. The CRC is an area for communication error check, and is assigned 8 bits. The CRC checks communication error by the following steps. That is, the communication node substitutes contents from the PRI to the DATA into a predetermined equation and writes a result of bit calculation into the CRC, and the node received CRC compares CRC with a received data. The EOM expresses the end of message with a predetermined bit string, and is assigned 8 bits. The RSP is an area in which the communication node received the data writes a response, and is assigned 2 bits. A result whether the communication data received could accurately interpret the contents of the frame or not is written in the RSP. Whether the communication node having sent the data needs to send it again or not is judged based on this result. The end of the data is EOF (End Of Frame), and is assigned 6 bits to show the end of frame by a predetermined bit string.

Each of the multiplex communication lines 21–23 is connected to the data repeater 4. The data repeater 4 repeats the data sent from the communication nodes 31–33 to the communication nodes 31–33 belonging to the other communication groups 11–13.

The data repeater 4 is made up of a communication IC performing an interface with the multiplex communication lines 21–23, microcomputer for controlling or the like, and is shown by function blocks in figure, and is made up of receiving buffers 411, 412, 413, sending buffers 421, 422, 423, a data controller 44 and a transfer-address table 45 described later by using FIG. 4 and so on.

The receiving buffers 411–413 and the sending buffers 421–423 are provided in accordance with each of the multiplex communication lines 21–23. The receiving buffers 411–413 receives data sent from the multiplex communication lines 21–23, and data to be sent are written in the sending buffers 421–423. The receiving buffers 411–413 and the sending buffers 421–423 are made up of the above-described communication IC. Here, data communication function may be built up as software executed by a CPU constructing the microcomputer. In this case, the receiving buffers 411–413 and the sending buffers 421–423 are assigned in RAM constructing the microcomputer.

The data controller 44 is initialized at predetermined intervals. The data controller 44 selects the multiplex communication line 21–23 through which the received data is to be repeated, and transfers the received data from the receiving buffers 411–413 to the sending buffers 421–423 for the multiplex communication lines 21–23 of the repeater. The data controller 44 can be achieved by software executed by the CPU constructing the microcomputer. The data controller 44, the receiving buffers 411–413 and the sending buffers 421–423 are set so that a data transfer process of the data controller 44, a receiving operation of the receiving buffers 411–413, and a sending operation of the sending buffers 421–423 are alternately repeated.

The transfer-address table 45 associates the MID of the received data with the sending buffers 421–423 for the multiplex communication line through which the received data is to be repeated. The transfer-address table 45 is constructed so that information whether it should transfer the received data of the MID to the sending buffers 421–423 for the multiplex communication line or not can be read from this transfer-address table 45, when the MID and the multiplex communication lines 21–23 are specified. The contents of the transfer-address table 45 are previously written in a ROM constructing the microcomputer with the control program of the data controller 44. FIG. 4 shows an example of the transfer-address table 45, and shows that: a read information should be transferred to the sending buffers 421–423 for the multiplex communication line when the read information is "1"; and a read information should not be transferred to the sending buffers 421–423 for the multiplex communication line when the read information is "0". In this figure, data V where MID=01h is transferred only to the sending buffer 422 for the second multiplex communication line 22, data W where MID=5Fh is transferred only to the sending buffer 423 for the third multiplex communication line 23, data X where MID=92h is transferred only to the sending buffer 421 for the first multiplex communication line 21, data Y where MID=C8h is transferred to both the sending buffer 421 for the first multiplex communication line and the sending buffer 422 for the second multiplex communication line, and data Z where MID=EBh is transferred to both the sending buffer 422 for the second multiplex communication line and the sending buffer 423 for the third multiplex communication line.

Furthermore, the data controller 44 is provided with a priority-reset means 430 executed among the data transfer process from the receiving buffers 411–413 to the sending buffers 421–423. The priority-reset means 430 resets a priority (PRI) of the data and transfers it to corresponding sending buffer 421–423.

Figure 6:
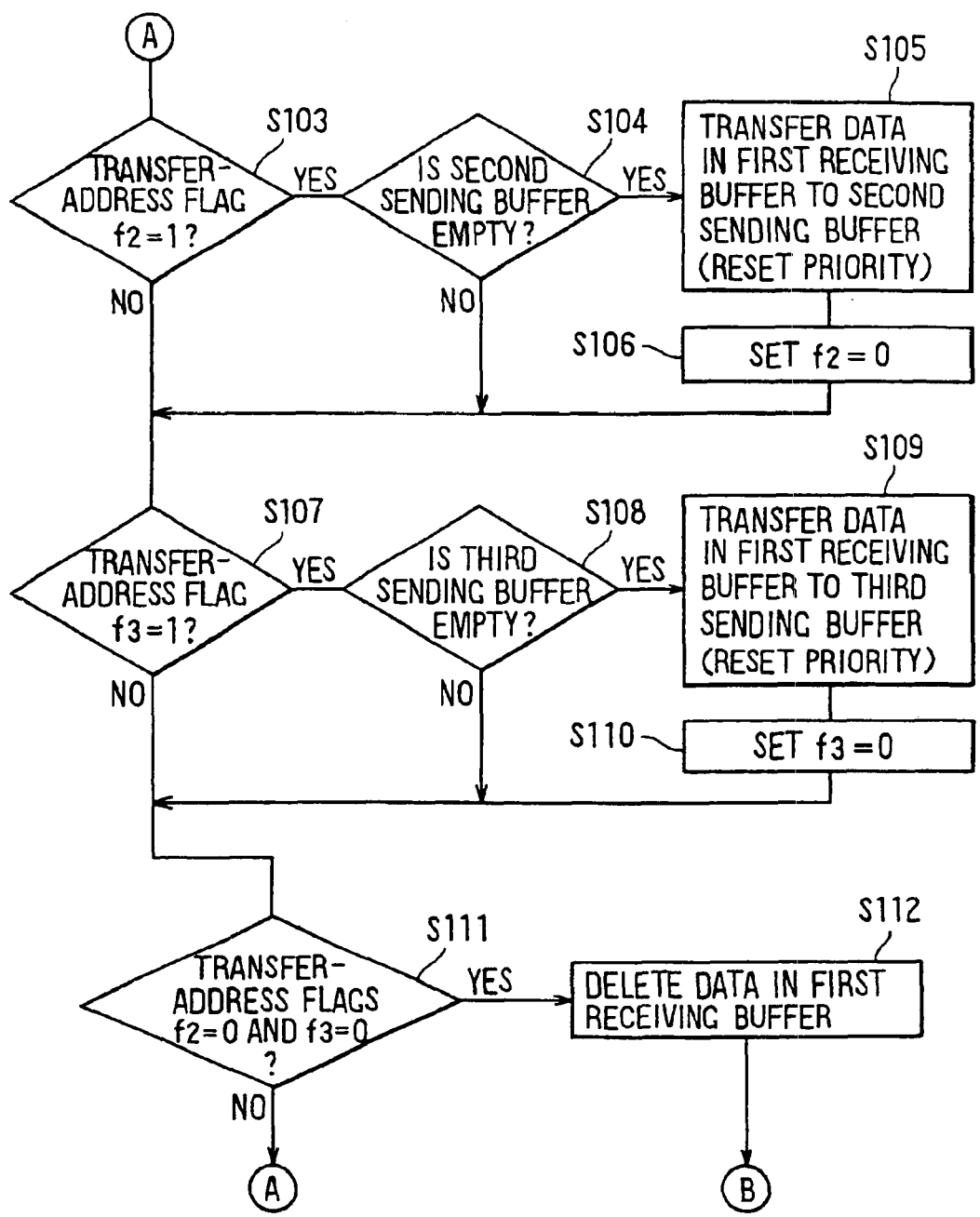
FIG. 6 is a second flowchart illustrating the control executed in the data controller of the data repeater of the first embodiment.
Figure 7:
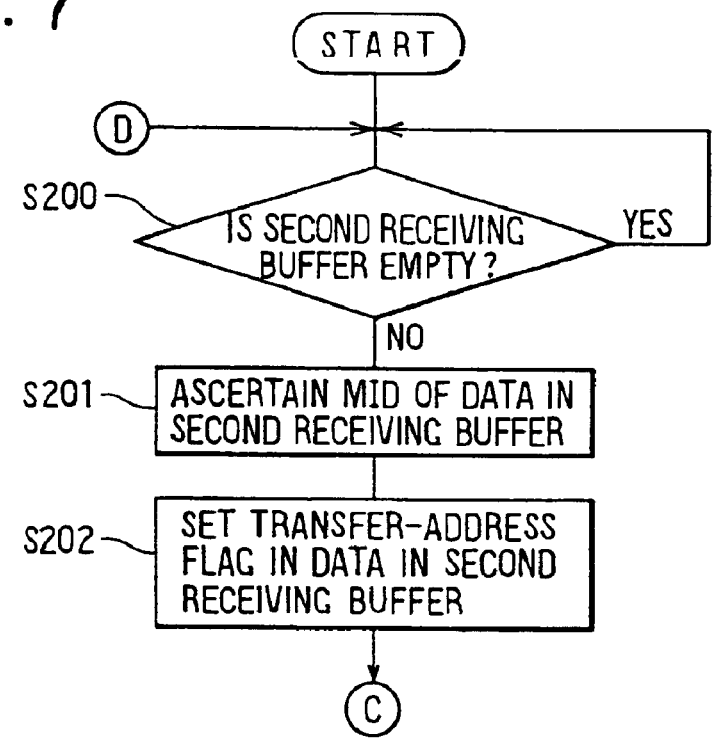
FIG. 7 is a third flowchart illustrating the control executed in the data controller of the data repeater of the first embodiment.
Figure 9:
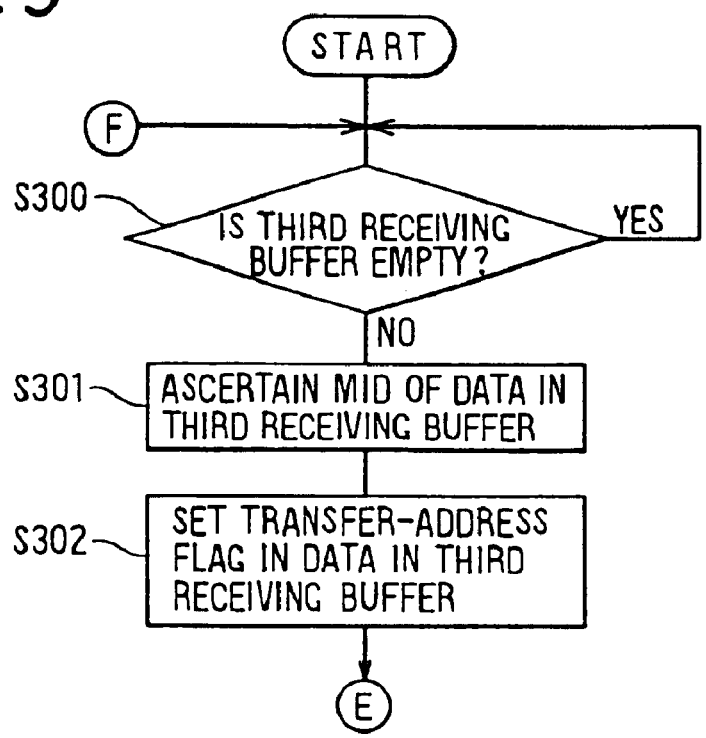
FIG. 9 is a fifth flowchart illustrating the control executed in the data controller of the data repeater of the first embodiment.
Figure 8:
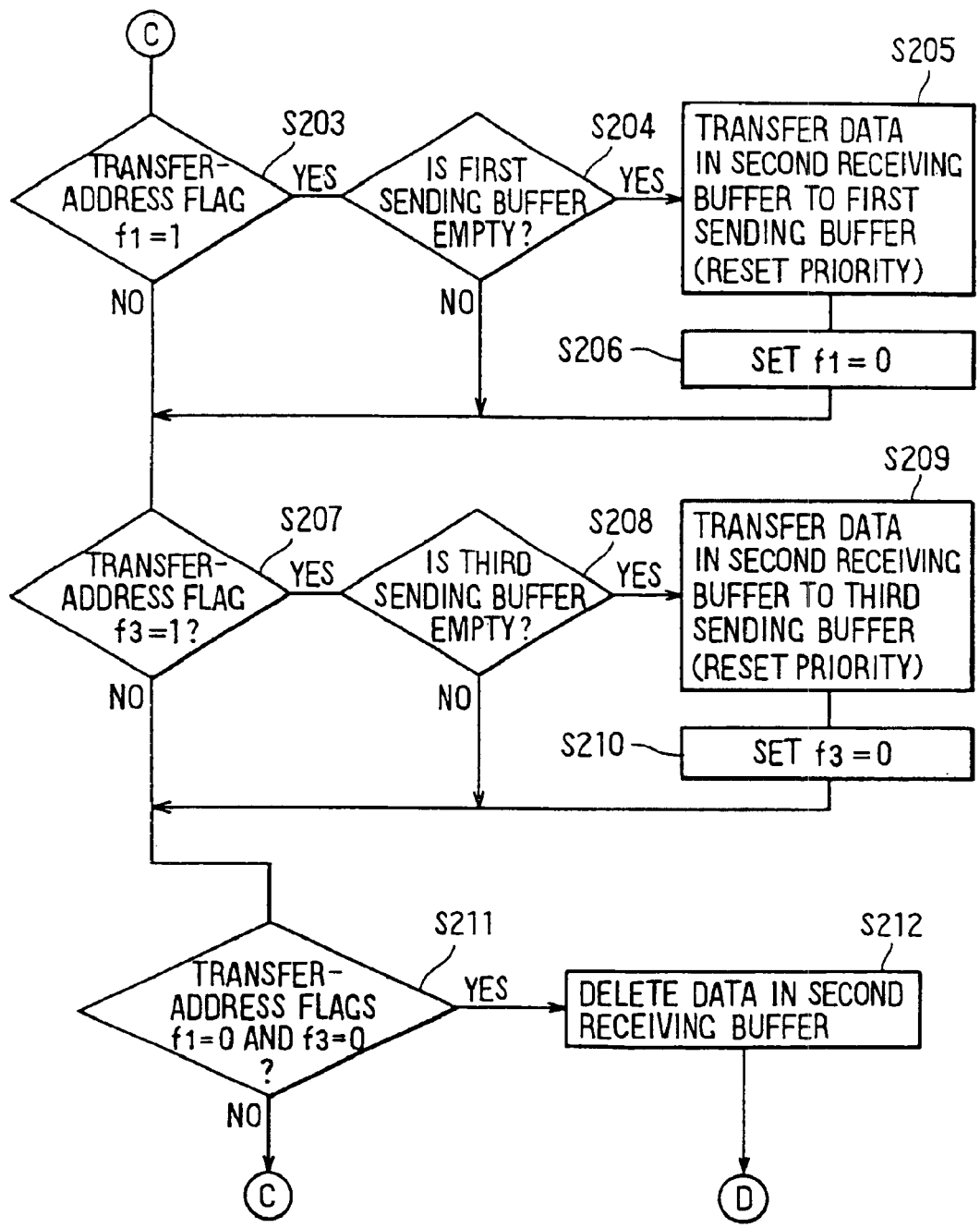
FIG. 8 is a fourth flowchart illustrating the control executed in the data controller of the data repeater of the first embodiment.
Figure 10:
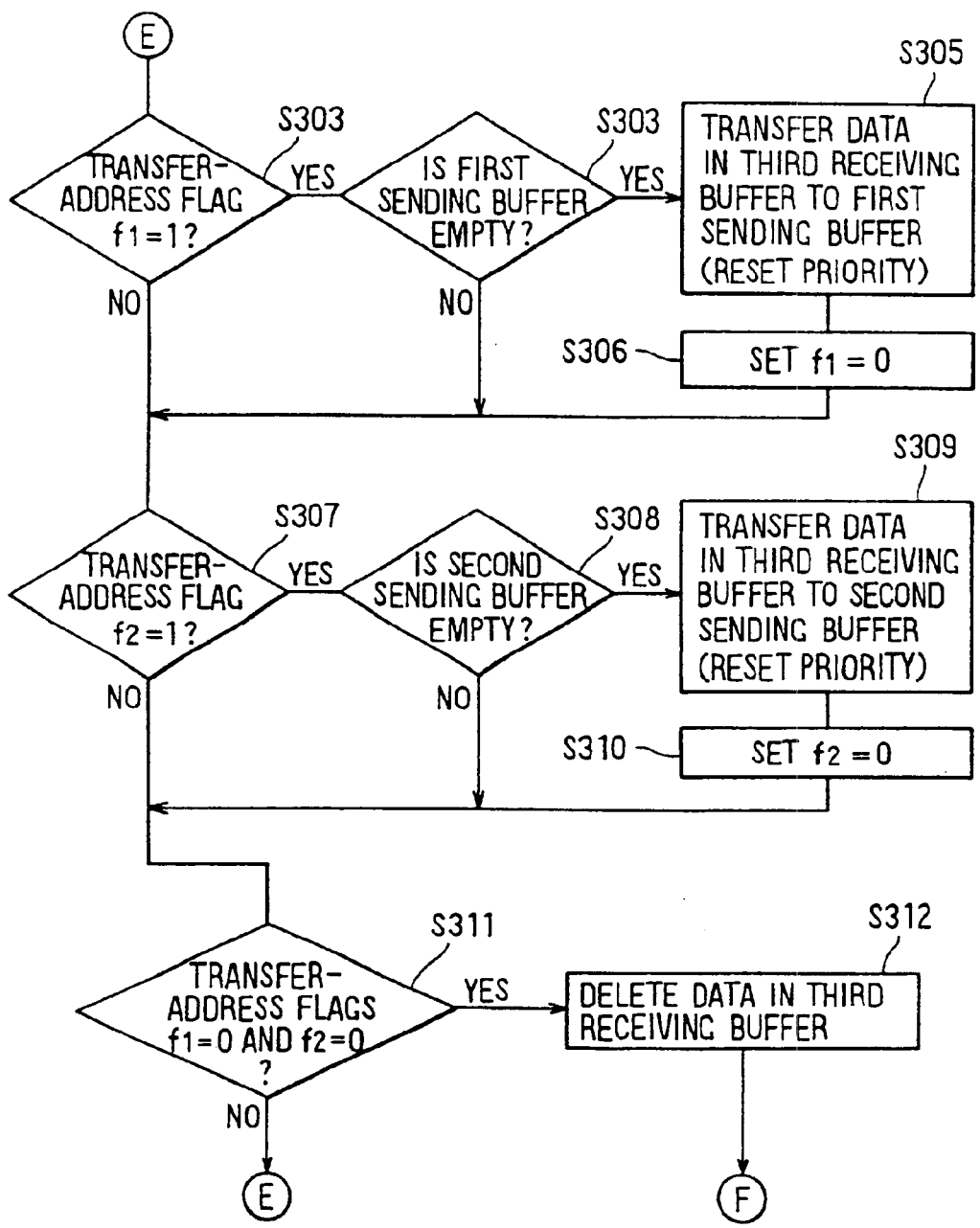
FIG. 10 is a sixth flowchart illustrating the control executed in the data controller of the data repeater of the first embodiment.

FIG. 5, FIG. 6, FIG. 7, FIG. 8, FIG. 9 and FIG. 10 show a flowchart illustrating the data transfer process including an operation of the priority reset means 430. FIG. 5 and FIG. 6 show the data transfer process from the receiving buffer (first receiving buffer) 411 for the first multiplex communication line 21 to the sending buffer (second sending buffer) 422 for the second multiplex communication line 22 and to the sending buffer (third sending buffer) 423 for the third multiplex communication line 23. FIG. 7 and FIG. 8 show the data transfer process from the receiving buffer (second receiving buffer) 412 for the second multiplex communication line 22 to the sending buffer (first sending buffer) 421 for the first multiplex communication line 21 and to the sending buffer 423 for the third multiplex communication line 23. FIG. 9 and FIG. 10 show the data transfer process from the receiving buffer (third receiving buffer) 413 for the third multiplex communication line 23 to the sending buffer 421 for the first multiplex communication line 21 and to the sending buffer 422 for the second multiplex communication line 22. The resetting of the priority (PRI) by the priority-reset means 430 is executed at steps S105, S109, S205, S209, S305 and S309.

At step S100, the priority-reset means 430 ascertains whether the receiving buffer 411 for the first multiplex communication line is empty or not. When it is not empty, that is, there is a received data, the priority-reset means 430 moves to step S101. At step S101, the priority-reset means 430 ascertains the MID of the data in the receiving buffer 411.

At following step S102, the priority-reset means 430 set a transfer-address flag to the received data by referring the data transfer-address table 45 based on the MID ascertained at step S101. The transfer-address flag is individually set to each of the multiplex communication lines 21–23, and shows that the data in the receiving buffer 411 should be transferred to the multiplex communication lines 21–23 when the transfer-address flag is set to "1". In other words, a transfer-address flag f1 is set to "1" when the data should be transferred to the sending buffer 421 for the first multiplex communication line; a transfer-address flag f2 is set to "1" when the data should be transferred to the sending buffer 422 for the second multiplex communication line; and a transfer-address flag f3 is set to "1" when the data should be transferred to the sending buffer 423 for the third multiplex communication line. After setting the transfer-address flag, the priority-reset means 430 moves to step S103.

Step S103 through step S106 are the transfer process from the receiving buffer 411 for the first multiplex communication line to the sending buffer 422 for the second multiplex communication line, and step S107 through step S110 are the transfer process from the receiving buffer 411 for the first multiplex communication line to the sending buffer 423 for the third multiplex communication line.

At step S103, the priority-reset means 430 ascertains whether the transfer-address flag f2 is "1" or not. When it is "1", the priority-reset means 430 moves to step S104. At step S104, the priority-reset means 430 ascertains whether the sending buffer 422 for the second multiplex communication line is empty or not. When the sending buffer 422 is empty, the priority-reset means 430 moves to step S105 and transfers data in the receiving buffer 411 for the first multiplex communication line to the sending buffer 422 for the second multiplex communication line. Here, the priority (PRI) of the transferred data is reset to (1111b), which is highest priority among settable priorities (PRI). The priority-reset means 430 set the transfer-address flag f2 of the data in the receiving buffer 411 to "0" at following step S106, and moves to step S107.

At step S107, the priority-reset means 430 ascertains whether the transfer-address flag f3 is "1" or not. When it is "1", the priority-reset means 430 moves to step S108. At step S108, the priority-reset means 430 ascertains whether the sending buffer 423 for the third multiplex communication line is empty or not. When the sending buffer 423 is empty, the priority-reset means 430 moves to step S109 and transfers data in the receiving buffer 411 for the first multiplex communication line to the sending buffer 423 for the third multiplex communication line. Here, the priority (PRI) of the transferred data is reset to the (1111b). The priority-reset means 430 set the transfer-address flag f3 of the data in the receiving buffer 411 to "0" at following step S110, and moves to step S111.

At step S111, the priority-reset means 430 ascertains whether the transfer-address flags f2=0 and f3=0 or not. When it is affirmed, it means that the data transfer to the sending buffers 422, 423 to which the data is to be transferred has completed, regarding the data in the receiving buffer 411 for the first multiplex communication line. The priority-reset means 430 deletes data in the receiving buffer 411 at step S112, and returned to step S100 (FIG. 5).

When at least one of steps S104, S108 is negated because the data is waiting for being sent in the sending buffer 422, 423, the priority-reset means 430 skips steps S105, S106, steps S109, S110. Therefore, at least one of the transfer-address flag f2, f3 remains "1". As a result, step S111 is negated, the step S112 is skipped, and the data in the receiving buffer 411 for the first multiplex communication line is kept as it is. In other words, the priority-reset means 430 waits for the sending buffers 422, 423 to which the data is to be transferred being empty. In this case, the priority-reset means 430 returns to step S103 again.

When the sending buffers 422, 423 to which the data is to be transferred are empty (steps S104, S108), steps S105, S106, and steps S109, S110 are executed so that the data, which could not be transferred due to a waiting for being sent, is transferred.

It should be noted that steps of step S100 or step S103 or later, after returning from step S112 to step S100 or from step S111 to step S103, are executed after executing the receiving operation of the receiving buffers 411–413 and the sending operation of the sending buffers 421–423.

Regarding the data received by the receiving buffer 412 for the second multiplex communication line, the priority-reset means 430 executes similar steps to those in FIG. 7 and FIG. 8. That is, the priority-reset means 430 ascertains whether the receiving buffer 412 is empty or not (step S200), ascertains the MID of the received data (step S201), sets the transfer-address flags f1, f3 to the data in the receiving buffer 412 by referring the transfer-address table 45 (step S202), and ascertains whether the transfer-address flags f1, f3 are "1" or not (steps S203, 5207). When the sending buffer 421 for the first multiplex communication line or the sending buffer 423 for the third multiplex communication line, which corresponds to the transfer-address flag set to "1", is empty (steps S204, S208), the priority-reset means 430 transfers the data in the receiving buffer 412 to the sending buffer 421 or 423 (steps S205, S209). At the time of the data transfer, the priority-reset means 430 reset the priority (PRI) of the data to the (1111b). The priority-reset means 430 set the transfer-address flags f1, f3, in which the data transfer is executed, to "0" (steps S206, S210). Furthermore, when the transfer-address flags f1=0 and f3=0 (step S211), the priority-reset means 430 deletes the data in the receiving buffer 412 at step S212, and returns to step S200; while when one of the transfer-address flags f1, f3 is "1", the priority-reset means 430 returns to step S203.

It should be noted that steps of step S200 or step S203 or later, after returning from step S212 to step S200 or from step S211 to step S203, are executed after executing the receiving operation of the receiving buffers 411–413 and the sending operation of the sending buffers 421–423.

Regarding the data received by the receiving buffer 413 for the third multiplex communication line, the priority-reset means 430 executes similar steps to those in FIG. 9 and FIG. 10. That is, the priority-reset means 430 ascertains whether the receiving buffer 413 is empty or not (step S300), ascertains the MID of the received data (step s301), sets the transfer-address flags f1, f2 to the data in the receiving buffer 413 by referring the transfer-address table 45 (step S302), and ascertains whether the transfer-address flags f1, f2 are "1" or not (steps S303, S307). When the sending buffer 421 for the first multiplex communication line or the sending buffer 422 for the second multiplex communication line, which corresponds to the transfer-address flag set to "1", is empty (steps S304, S308), the priority-reset means 430 transfers the data in the receiving buffer 413 to the sending buffer 421 or 422 (steps S305, S309). At the time of the data transfer, the priority-reset means 430 reset the priority (PRI) of the data to the (1111b). Furthermore, when the transfer-address flags f1=0 and f2=0 (step S311), the priority-reset means 430 deletes the data in the receiving buffer 413 at step S312, and returns to step S300; while when one of the transfer-address flags f1, f2 is "1", the priority-reset means 430 returns to step S303.

It should be noted that steps of step S300 or step S303 or later, after returning from step S312 to step S300 or from step S311 to step S303, are executed after executing the receiving operation of the receiving buffers 411–413 and the sending operation of the sending buffers 421–423.

Figure 11:
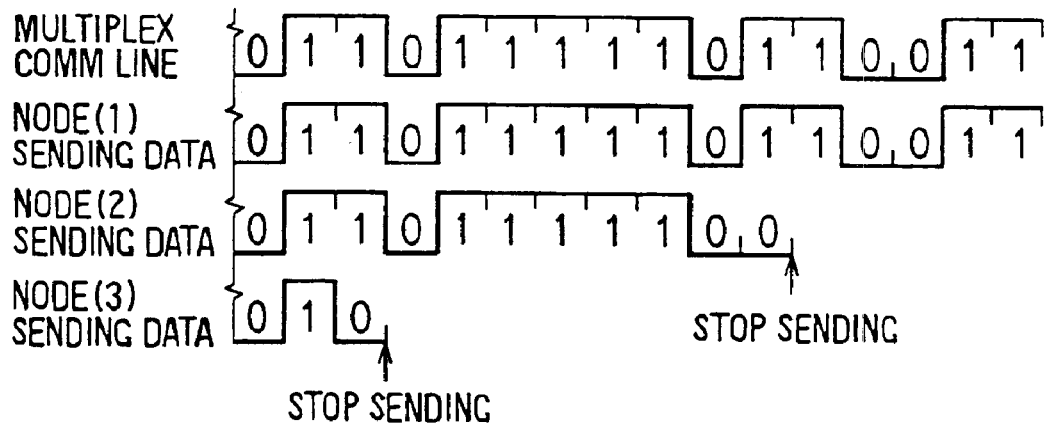
FIG. 11 is a time chart illustrating data collision arbitration on a multiplex communication line.

FIG. 11 explains a data collision arbitration of the communication data according to the BEAN protocol, and shows an example where plural of communication nodes start sending to the same multiplex communication line each other. In this figure, three communication nodes start sending at the same time. Data is made up of binary bit string, and is set either "1" or "0" in the multiplex communication line when the data are started to be sent. Each of the communication nodes monitor the multiplex communication line, and stops sending own data when specific communication node recognizes an existence of data having priority higher than that of data sending by the specific communication node itself as a result of monitoring. Since the priority of "1" is higher than that of "0" according to the BEAN protocol, each of the communication nodes stops sending when own sending data is "0" and the monitor result on the multiplex communication line becomes "1". In this figure, a communication node ③ stops sending at first, and then a communication node ② stops, and only a node ① continues sending.

In this embodiment, since the data repeater 4 transfers data to the sending buffers 421–423 with setting the priority (PRI) to the highest, a repeating data can continue sending even if the data collides other data sent by any other communication nodes 31–33. Therefore, the data received by the data repeater 4 can be immediately sent to the multiplex communication lines 21–23 to which the data is to be transferred without delaying in the data repeater 4. It can prevent the data waiting for being sent from being overwriting by the newly received data and from being lost, and can prevent the data communication from causing trouble.

Furthermore, since the priority (PRI) after setting is set to the highest one among the settable priority (0000b–1111b), the data repeater 4 can perform an erasing prevention effect of data waiting for being sent without considering the priority of the communication data. Therefore, the present invention can be widely applied. Furthermore, even if further communication data is newly added as a result of adding the communication nodes 31–33 or the like, the data repeater 4 can perform the erasing prevention effect of the data waiting for being sent without changing specifications of the data controller 44, because the priority after setting is higher than that of added data independent of type of the added data. Therefore, the present invention has a high expandability.

Here, when the types of the communication data are fixed and there is no addition of the communication nodes 31–33, it is not essential to set the priority after setting to 1111b, which is the highest one, and the priority may set to higher one than priorities of any other data sent to the multiplex communication lines 21–23.

(Second embodiment)

Figure 12:
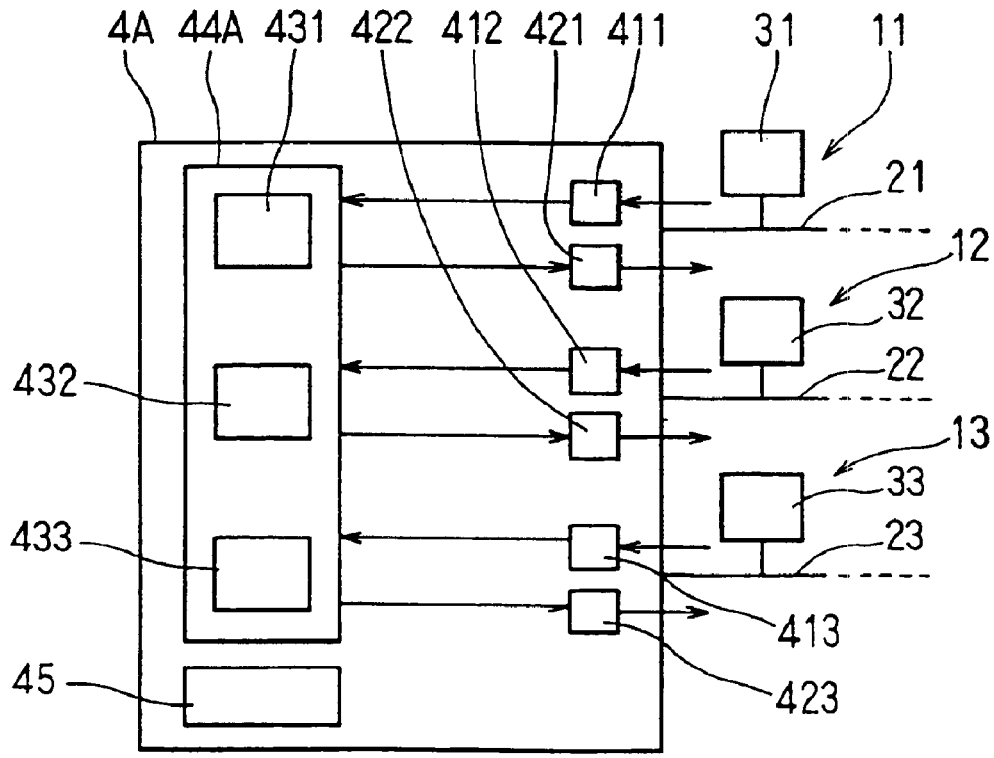
FIG. 12 is a diagram of a structure of a data repeater and a multiplex communication system of a second embodiment according to the present invention.

FIG. 12 shows a data repeater and a multiplex communication system of a second embodiment according to the present invention. Differences between the first embodiment are mainly explained. The data repeater of this embodiment is formed by replacing a part of the data controller of the first embodiment with a modified another data controller 44A. The data controller 44A includes a plurality of priority-reset means 431, 432, 433 respectively provided to each of the multiplex communication lines 21–23. When the multiplex communication line through which the data is to be repeated is the first multiplex communication line, a first priority reset means 431 resets the priority of transferring data; when the multiplex communication line through which the data is to be repeated is the second multiplex communication line, a second priority reset means 432 resets the priority of transferring data; and when the multiplex communication line through which the data is to be repeated is the third multiplex communication line, a third priority reset means 433 resets the priority of transferring data. Each of the priority-reset means 431–433 resets to a predetermined priority. The priority after setting is set as follows. The priority after setting is set to higher one than priorities of any other data sent to the multiplex communication lines through which the data is to be repeated.

The data controller 44A is set to execute basically the same process as the data transfer process (FIG. 5 through FIG. 10) of the first embodiment. Different steps of the priority reset means 431–433 are as follows. That is, the priority reset means 431 for the first multiplex communication line resets to a reset-priority for the first multiplex communication line at steps S205, S305; the priority reset means 432 for the second multiplex communication line resets to a reset-priority for the second multiplex communication line at steps S105, S309; and the priority reset means 433 for the third multiplex communication line resets to a reset-priority for the third multiplex communication line at steps S109, S209.

In this structure, the data repeating can be immediately performed without prolonging a condition of waiting for being sent in each of the sending buffers 421–423, because the data sent from the data repeater 4A has a high priority than priorities of any other data sent to the multiplex communication lines 21–23 to which the data are to be sent.

Here, in each of these embodiments, each of the receiving buffers 411–413 and each of the sending buffers 421–423 for the multiplex communication lines 21–23 are formed in a unique structure, however, they may be formed in plural structures. These plural receiving buffers and sending buffers may be used by being stacked. In this case, the data controller is set so that the priority is reset and transferred from the receiving buffer at last stage to the sending buffer at first stage.

In each of these embodiments, the priority after setting is previously determined. However, the priority-reset means may reset higher priority by, for example, adding a constant value to the priority of the received data.

(Third embodiment)

Figure 13:
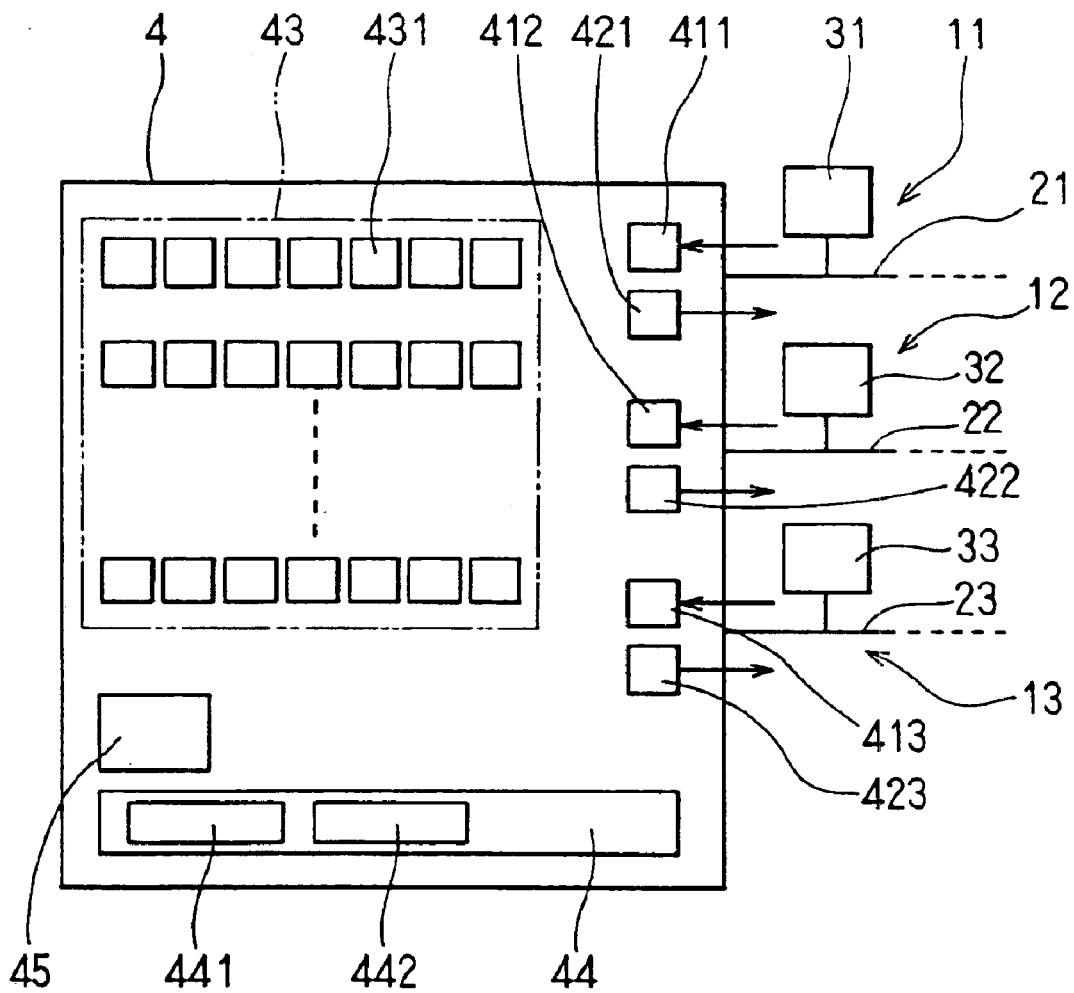
FIG. 13 is a diagram of a structure of a data repeater and a multiplex communication system of a third embodiment according to the present invention.

FIG. 13 shows a data repeater and a multiplex communication system of a third embodiment according to the present invention. The multiplex communication system is made up of a plurality of (three in figure) communication groups 11, 12, 13, and a data repeater 4. Each of the communication groups 11–13 is constructed by connecting communication nodes 31, 32, 33 to multiplex communication lines 21, 22, 23, and performs sending and receiving of data among the communication nodes 31–33 based on a predetermined protocol. At least one of the communication nodes 31–33 belongs each of the communication group 11–13.

Figure 14:
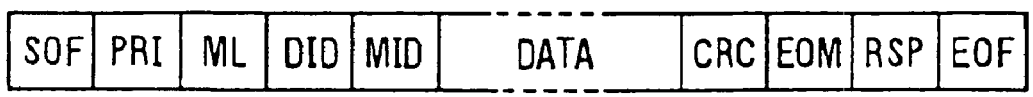
FIG. 14 is a diagram illustrating a frame of communication data of the data repeater and the multiplex communication system of the third embodiment.

FIG. 14 shows an example of a frame structure of the above-described data. This is a frame structure based on the BEAN (Body Electronics Area Network) protocol of vehicle. Here, data communication described hereinafter is assumed to follow this BEAN protocol. SOF (Start Of Frame) means a start of a frame, and is assigned 1 bit. PRI (Priority) is an area showing priority of the frame, and is assigned 4 bits. The priority of "1" is higher than that of "0". When data are collided each other on the multiplex communication lines 21–23 in each of the communication groups 11–13, the data repeater 4 and the communication nodes 31–33 prioritize the data having high priority and stop sending the other data. ML (Message Length) is an area showing a length of following message portion, and has length of the number of byte of DATA plus two, because DID and MID both of which construct the message portion respectively have 1 byte as described later and because the DATA has a variable length.

First portion of the message portion is the DID (Destination ID), and is an area showing a destination address node ID of the frame. The MID (Message ID) is an area showing a message ID, and is assigned 8 bits. The MID is given to individual types of data, and specifies the type of data shown by contents of the DATA described later. There is the number of engine revolutions or the like as the type of data communicated by communication. As shown FIG. 15, the MID is given to each of the data, for example. When it is explained using this figure, DATA of the communication data where MID=08h shows the number of the engine revolutions, DATA of the communication data where MID=A5h shows vehicle speed, and DATA of the communication data where MID=DDh shows a condition of power window switch. The DATA are assigned within 1 to 11 byte in area of the main data.

After the DATA, CRC (Cyclic Redundancy Characters), EOM (End of Message) and RSP (Response) are followed. The CRC is an area for communication error check, and is assigned 8 bits. The CRC checks communication error by the following steps. That is, the communication node substitutes contents from the PRI to the DATA into a predetermined equation and writes a result of bit calculation into the CRC, and the node received CRC compares CRC with a received data. The EOM expresses the end of message with a predetermined bit string, and is assigned 8 bits. The RSP is an area in which the communication node received the data writes a response, and is assigned 2 bits. A result whether the communication data received could accurately interpret the contents of the frame or not is written in the RSP. Whether the communication node having sent the data needs to send it again or not is judged based on this result. The end of the data is EOF (End Of Frame), and is assigned 6 bits to show the end of frame by a predetermined bit string.

Each of the multiplex communication lines 21–23 is connected to the data repeater 4. The data repeater 4 repeats the data sent from the communication nodes 31–33 to the communication nodes 31–33 belonging to the other communication groups 11–13.

Figures 15, 16, 17:
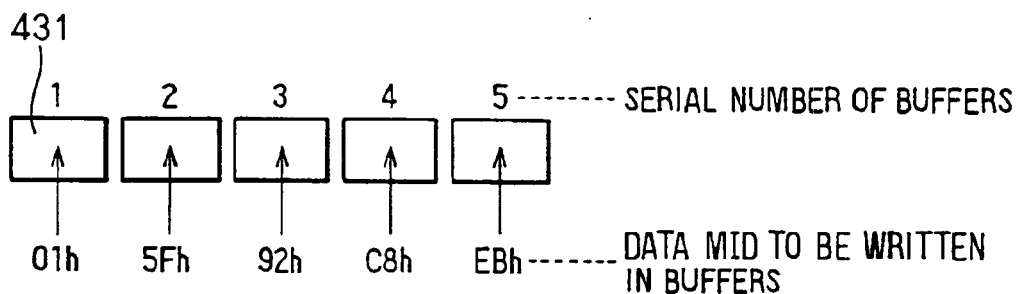
FIG. 15 is a diagram illustrating a relationship between types of the communication data of the data repeater and the multiplex communication system and an MID thereof of the third embodiment.
FIG. 16 is a schematic diagram of a buffer in the data repeater of the third embodiment.
FIG. 17 is a diagram illustrating a relationship between data in a transfer-address table of the data repeater and a transfer address thereof of the third embodiment.

The data repeater 4 is made up of a communication IC performing an interface with the multiplex communication lines 21–23, microcomputer for controlling or the like, and is shown by function blocks in figure, and is made up of receiving buffers 411, 412, 413, sending buffers 421, 422, 423, a group of buffers (buffer group) 43, a data controller 44 and a transfer-address table 45 described later by using FIG. 16 and so on.

The receiving buffers 411–413 and the sending buffers 421–423 are provided in accordance with each of the multiplex communication lines 21–23. The receiving buffers 411–413 receives data sent from the multiplex communication lines 21–23, and data to be sent are written in the sending buffers 421–423. The receiving buffers 411–413 and the sending buffers 421–423 are made up of the above-described communication IC. Here, data communication function may be built up as software executed by a CPU constituting the microcomputer. In this case, the receiving buffers 411–413 and the sending buffers 421–423 are assigned in RAM constructing the microcomputer.

The buffer group 43 includes a plurality of buffers 431. Each of the buffers 431 temporally store the data revived by the receiving buffers 411–413 before the data is transferred to the sending buffers 421–423, as described later. The number of the buffers 431 corresponds to the number of types of data to be repeated, and the type of the data specified by the MID individually corresponds to each buffer 431 one-to-one. For example, when there are five types of data to be transferred, five buffers 431 are provided, the data controller 44 brings each of the buffers 431 into correspondence with MID of data to be written therein. For example, as shown in FIG. 16, the buffer 431 having a serial number 1 is used for writing data whose MID=01h, the buffer 431 having a serial number 2 is used for writing data whose MID=5Fh, the buffer 431 having a serial number 3 is used for writing data whose MID=92h, the buffer 431 having a serial number 4 is used for writing data whose MID=C8h, and the buffer 431 having a serial number 5 is used for writing data whose MID=Ebh. Here, in the following explanation, the buffer 431 having a serial number n (n: natural number) is described as buffer n. Data region of the buffer group 43 is assigned in the RAM constituting the microcomputer.

The data controller 44 selects one of the multiplex communication lines 21–23 of which the received data is to be sent, and transfers the received data to one of the sending buffers 421–423 of the multiplex communication lines 21–23 of which the received data is to be sent. The data controller 44 starts up at every predetermined interval, controls the data transfer from the receiving buffers 411–413 to the buffers 431, and controls the data transfer from the buffers 431 to the sending buffers 421–423. The data controller 44 can be realized by software executed by a CPU, which constitutes a microcomputer. The data controller 44, the receiving buffers 411–413, and the sending buffers 421–423 are set so that receiving operations of the receiving buffers 411–413 and sending operations of the sending buffers 421–423 are alternately repeated.

The transfer-address table 45 associates the MID of the received data with the sending buffers 421–423 for the multiplex communication line through which the received data is to be repeated. The transfer-address table 45 is constructed so that information whether it should transfer the received data of the MID to the sending buffers 421–423 for the multiplex communication line or not can be read from this transfer-address table 45, when the MID and the multiplex communication lines 21–23 are specified. The contents of the transfer-address table 45 are previously written in a ROM constructing the microcomputer with the control program of the data controller 44. FIG. 17 shows an example of the transfer-address table 45, and shows that: a read information should be transferred to the sending buffers 421–423 for the multiplex communication line when the read information is "1"; and a read information should not be transferred to the sending buffers 421–423 for the multiplex communication line when the read information is "0". In this figure, data V where MID=01h is transferred only to the sending buffer 422 for the second multiplex communication line 22, data W where MID=5Fh is transferred only to the sending buffer 423 for the third multiplex communication line 23, data X where MID=92h is transferred only to the sending buffer 421 for the first multiplex communication line 21, data Y where MID=C8h is transferred to both the sending buffer 421 for the first multiplex communication line and the sending buffer 422 for the second multiplex communication line, and data Z where MID=EBh is transferred to both the sending buffer 422 for the second multiplex communication line and the sending buffer 423 for the third multiplex communication line.

Furthermore, the data controller 44 is provided with buffer assign means 441 executed during the data transfer process from the receiving buffers 411–413 to the buffer group 43. The buffer assign means 441 recognizes MID of the data in the receiving buffers 411–413, and assigns the buffers 431 corresponding the MID as a transfer-address of the data in the receiving buffers 411–413. As a result, the received data is written to the buffers 431 corresponding to the MID individually.

Furthermore, the data controller 44 is provided with buffer ascertain means 442 executed during the data transfer process from the buffer group 43 to the sending buffers 421–423. The buffer ascertain means 442 sequentially ascertains an existence of data to be sent in the buffers 431.

Figure 18:
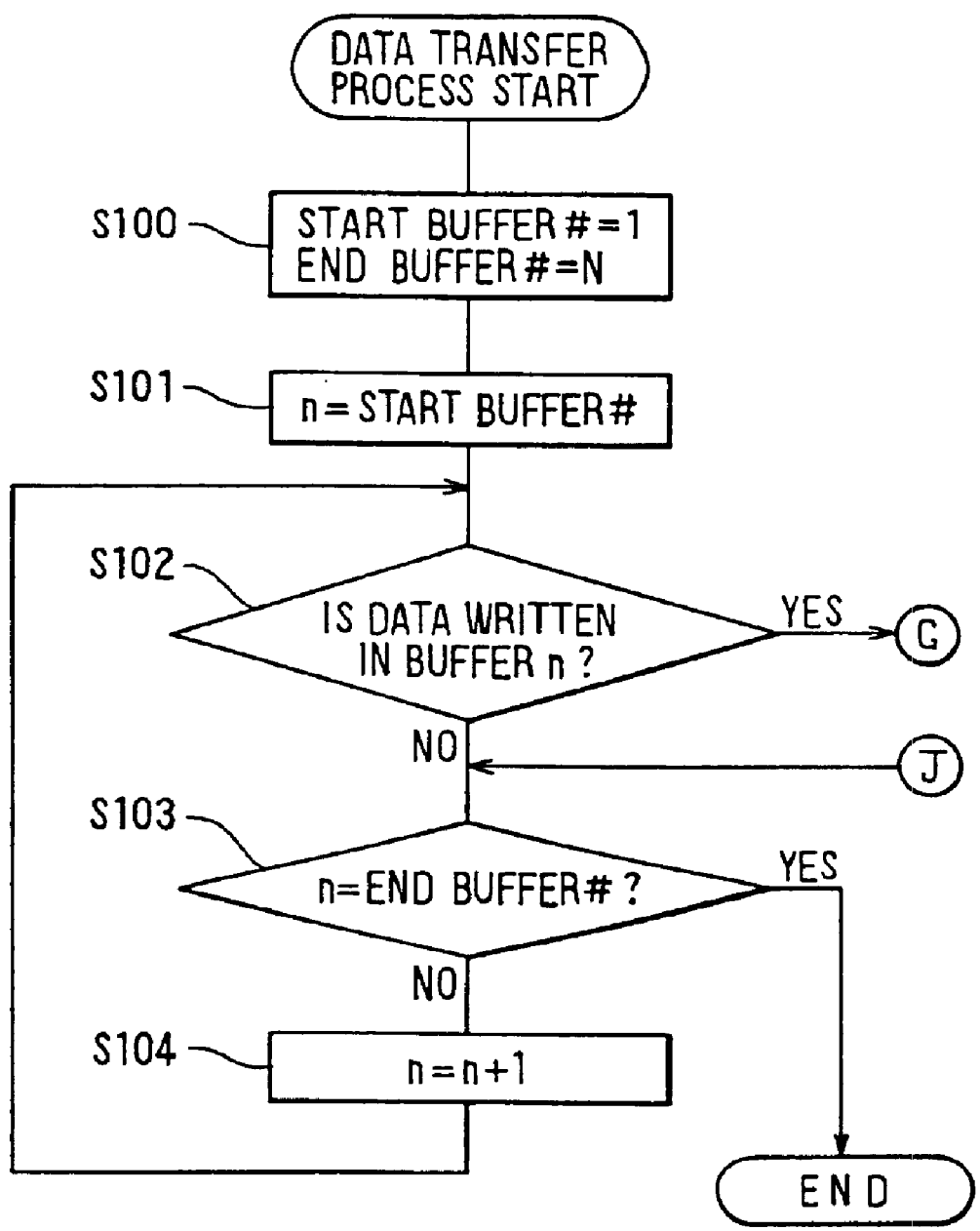
FIG. 18 is a first flowchart illustrating a control executed in a data controller of the data repeater of the third embodiment.
Figure 19:
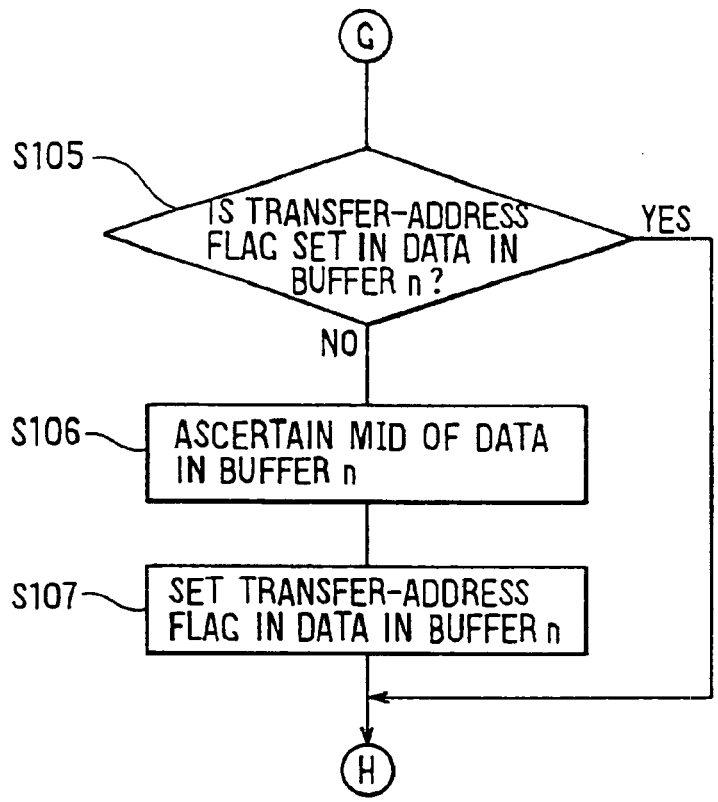
FIG. 19 is a second flowchart illustrating the control executed in the data controller of the data repeater of the third embodiment.

FIGS. 18, 19, 20 and 21 show a flowchart illustrating the data transfer process from the buffer group 43 to the sending buffers 421–423, including an operation of the buffer ascertain means 442. At step S100, the data controller sets a start buffer number (#)=1 and an end buffer number (#)=N. Here, "N" is the number of the buffers 431 constituting the buffer group 43. At step S101, the data controller 44 sets n=start buffer # (=1). At step S102, the data controller 44 ascertains whether the data is written in the buffer n. When the data is written, the process is moved to step S105 (FIG. 19). At step S105, the data controller ascertains whether the transfer-address flag of the data in the buffer n is determined. The transfer-address flag is determined to each of the multiplex communication line 21–23. When the transfer-address flag is set "1", it means that the buffer n should transfer the data to its multiplex communication line 21–23.

When the transfer-address flag is not set, the data controller 44 executes steps S106, S107 to set the transfer-address flag. At step S106, the data controller 44 ascertains the MID of the data in the buffer n. At step 5107, the data controller 44 obtains the transfer-address of the data in the buffer n by referring the data transfer-address table 45, and sets the transfer-address flag of the data in the buffer n. In other words, the transfer-address flag f1 is set to "1" when the data is to be transferred to the sending buffer 421 for the first multiplex communication line; the transfer-address flag f2 is set to "1" when the data is to be transferred to the sending buffer 422 for the second multiplex communication line; and the transfer-address flag f3 is set to "1" when the data is to be transferred to the sending buffer 423 for the third multiplex communication line.

Figure 20:
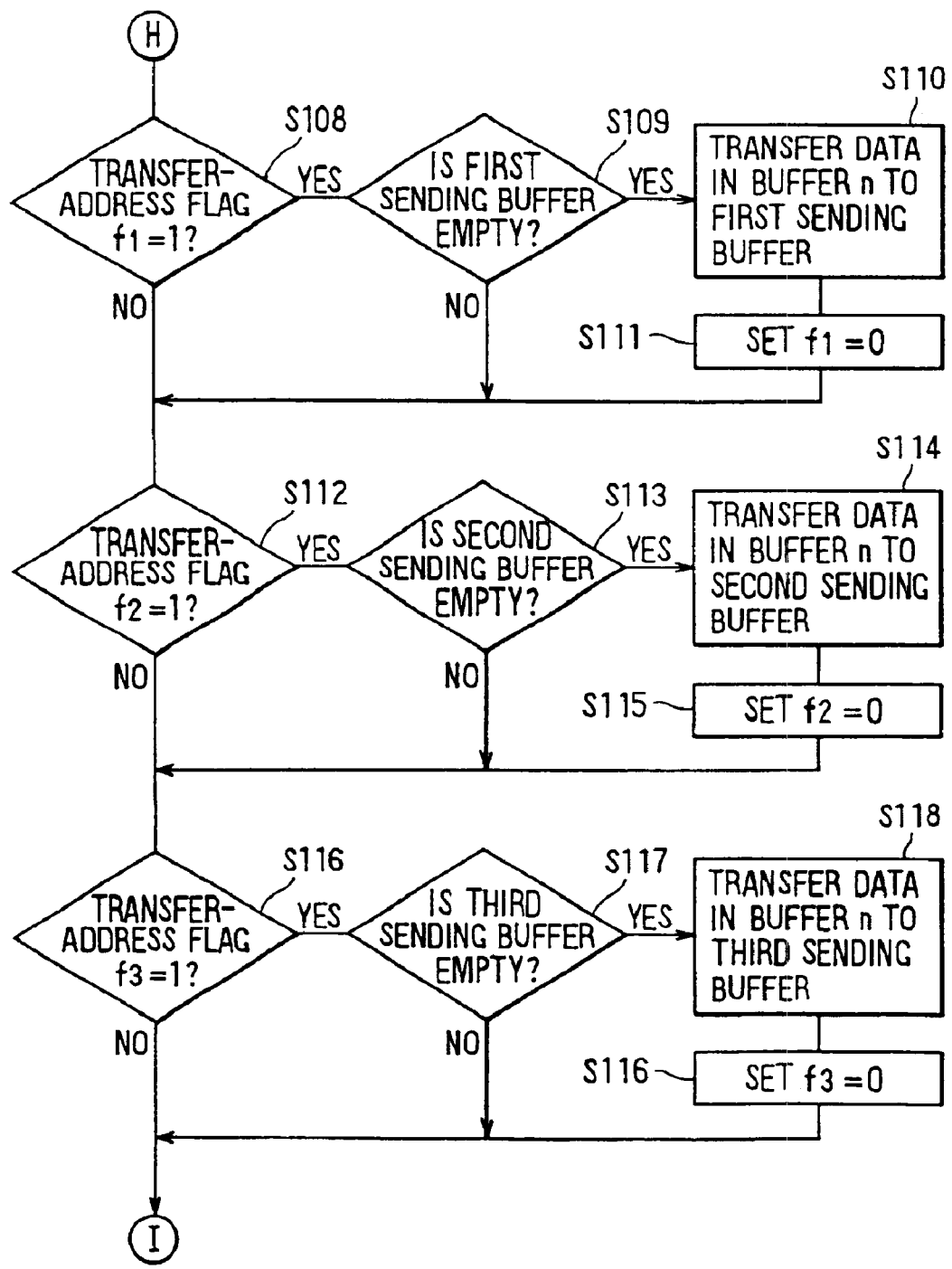
FIG. 20 is a third flowchart illustrating the control executed in the data controller of the data repeater of the third embodiment.

After setting the transfer-address flag, the data controller 44 moves to step S108 (FIG. 20). At step S108, the data controller 44 ascertains the transfer-address flag f1, and moves to step S109 when f1="1". At step S109, the data controller ascertains whether the sending buffer (first sending buffer) 421 for the first multiplex communication line is empty or not. When the sending buffer 421 is empty, the data controller 44 moves to step S110 to transfer the data in the buffer n to the sending buffer 421. After that, at the following step S111, the data controller 44 set the transfer-address flag f1 of the buffer n to "0", and moves to step S112.

At step S112, the data controller ascertains whether the transfer-address flag f2 is "1" or not. When f2="1", the data controller 44 moves to step S113. At step S113, the data controller 44 ascertains whether the sending buffer (second sending buffer) 422 for the second multiplex communication line is empty of not. When the sending buffer 422 is empty, the data controller moves to step S114 to transfer the data in the buffer n to the sending buffer 422. After that, at the following step S115, the data controller 44 set the transfer-address flag f2 of the buffer n to "0", and moves to step S116.

Figure 21:
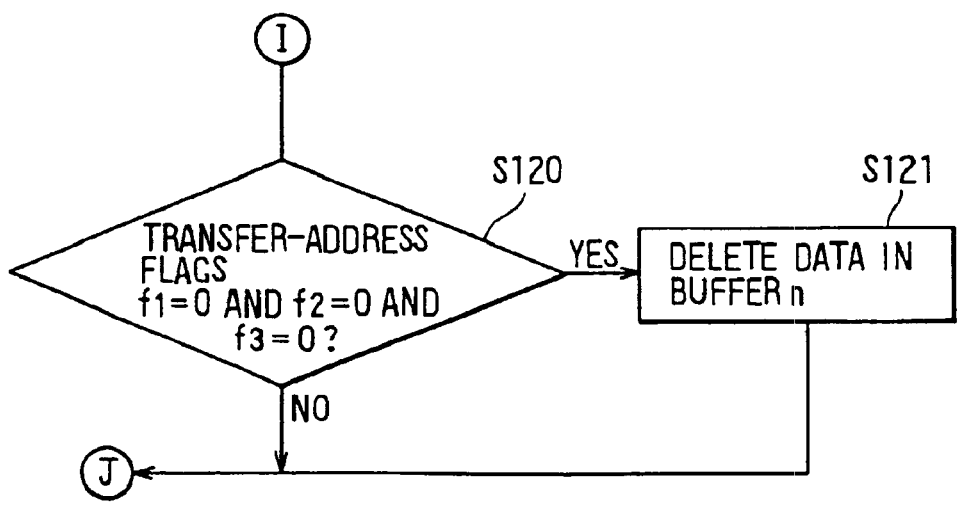
FIG. 21 is a fourth flowchart illustrating the control executed in the data controller of the data repeater of the third embodiment.

At step S116, the data controller ascertains whether the transfer-address flag f3 is "1" or not. When f3="1", the data controller 44 moves to step S117. At step S117, the data controller 44 ascertains whether the sending buffer (third sending buffer) 423 for the third multiplex communication line is empty of not. When the sending buffer 423 is empty, the data controller moves to step S118 to transfer the data in the buffer n to the sending buffer 423. After that, at the following step S119, the data controller 44 set the transfer-address flag f3 of the buffer n to "0", and moves to step S120 (FIG. 21).

At step S120, the data controller 44 ascertains whether the transfer-address flags are f1=0, f2=0 and f3=0, or not. When it is affirmed, it means that the transfer of the data to be transferred to the sending buffers 421–423 is completed. Therefore, the data controller 44 deletes the data in the buffer n at step S121, and moves to step S103 (FIG. 18).

At step S103, the data controller 44 judges whether n is equal to the end buffer number or not. When n≠end buffer number, the data controller 44 increases the n by 1 step at step S104, and returns to step S102 to execute steps S102, S108–S121 for the buffer having a next serial number. As described the above, the data controller ascertains the existence of the data to be sent in the buffers 431 in order of the serial number of the buffers 431, and transfers the data to the predetermined sending buffers 421–423 when the data is held therein. After transferring of the data in the last buffer N, the data controller discontinues the data transfer process.

In the data transfer process, when the sending buffers 421–423 hold the data for sending it, one of steps S109, S113 and S117 is denied. In this case, the data controller 44 skips steps S110, S111, steps S114, S115, steps S118, S119, so that the transfer-address flag f1 remains "1". Therefore, step S120 is denied, so that the data controller 44 skips step S121 and that the data in the buffer n is held. In other words, the data controller 44 waits for the sending buffers 421–423, of which the data is to be sent, being empty. In this case, in next data transfer process, the data controller 44 skips steps S105, S106 and S107, and executes steps S108 through S119. Furthermore, the data controller 44 transfers the data, which is not transferred due to waiting for being sent in the last process, when the sending buffers 421–423, of which the data is to be sent, are empty.

When the condition, in which the data controller 44 waits for the sending buffers 421–423 being empty, continues, the data controller 44 does not transfer the data from the buffer group 43 to the sending buffers 421–423. When the data controller 44 receives the newly data of the same type as the data held in the buffer 431, this buffer 431 is overwritten by the newly received data. However, there is no trouble in the data communication, because it can prevent the data from being overwritten by the data of different type, by individually providing the buffers 431 to each type of data to be repeated. Furthermore, this system can be achieved by a simple structure, because the number of the buffers 431 constituting the buffer group 43 is enough to be the number of types of data to be repeated.

Furthermore, since the data controller 44 sequentially ascertains the existent of the data in the buffers 431, it can accurately ascertain the existent of the data, which is to be transferred from the buffer group 43 to the sending buffers 421–423 and is to be sent to the multiplex communication lines 21–23.

Here, the buffer group 43 can immediately send important data to the multiplex communication lines 21–23 of which the data is to be repeated, by assigning a buffer 431 having small serial number to a more important type data enough to be sent immediately, for example, a type of data having a high priority (PRI).

Here, the data controller 44 ascertains the data to be sent regarding all buffers 431 in the data transfer process from the buffer group 43 to the sending buffers 421–423. However, the data controller 44 may execute the data transfer process regarding buffers 431 having former half of serial number in the buffer group 43 at first, and execute the data transfer process regarding buffers 431 having latter half of serial number in the buffer group 43 when it is started up in next process, so that the data controller ascertain all the buffer group 43 by two data transfer processes. In this case, the data controller 44 can immediately send the important data to the multiplex communication lines 21–23 to which the data is to be repeated, by executing the data transfer process in both 2 processes regarding the buffer group 431 corresponding important data type.

(Fourth embodiment)

Figure 22:
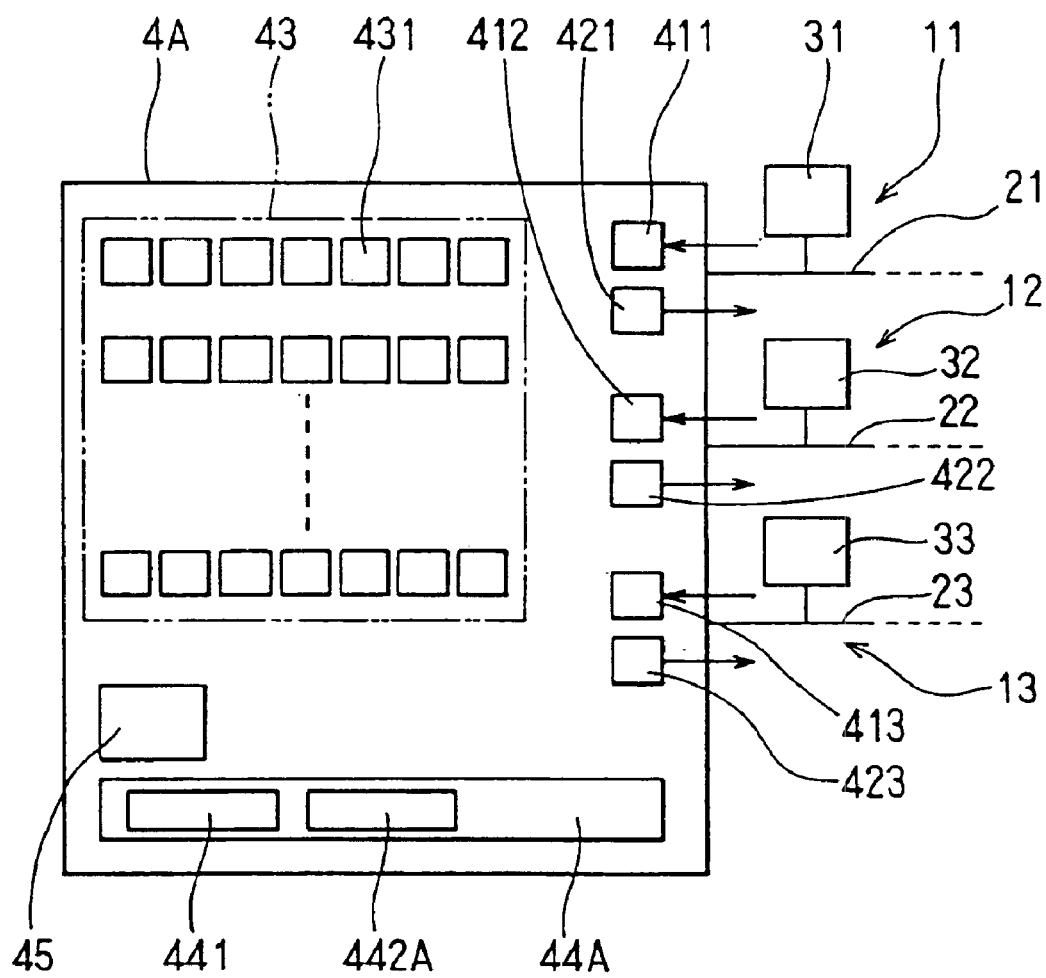
FIG. 22 is a diagram of a structure of a data repeater and a multiplex communication system of a fourth embodiment according to the present invention.

FIG. 22 shows a data repeater and a multiplex communication system of a fourth embodiment according to the present invention. The data controller of the third embodiment is replaced with another one. In the data controller of the third embodiment, the buffer ascertain means ascertains the existence of the data from the buffer 1 to buffer N by fixing the start buffer number and the end buffer number in the data transfer process, however, a data controller 44A of the fourth embodiment is constructed so that buffer ascertain means 442A updates the start buffer number and the end buffer number every starting up so that an order of ascertain is shifted. A difference between the third embodiment will be mainly explained.

Figure 23:
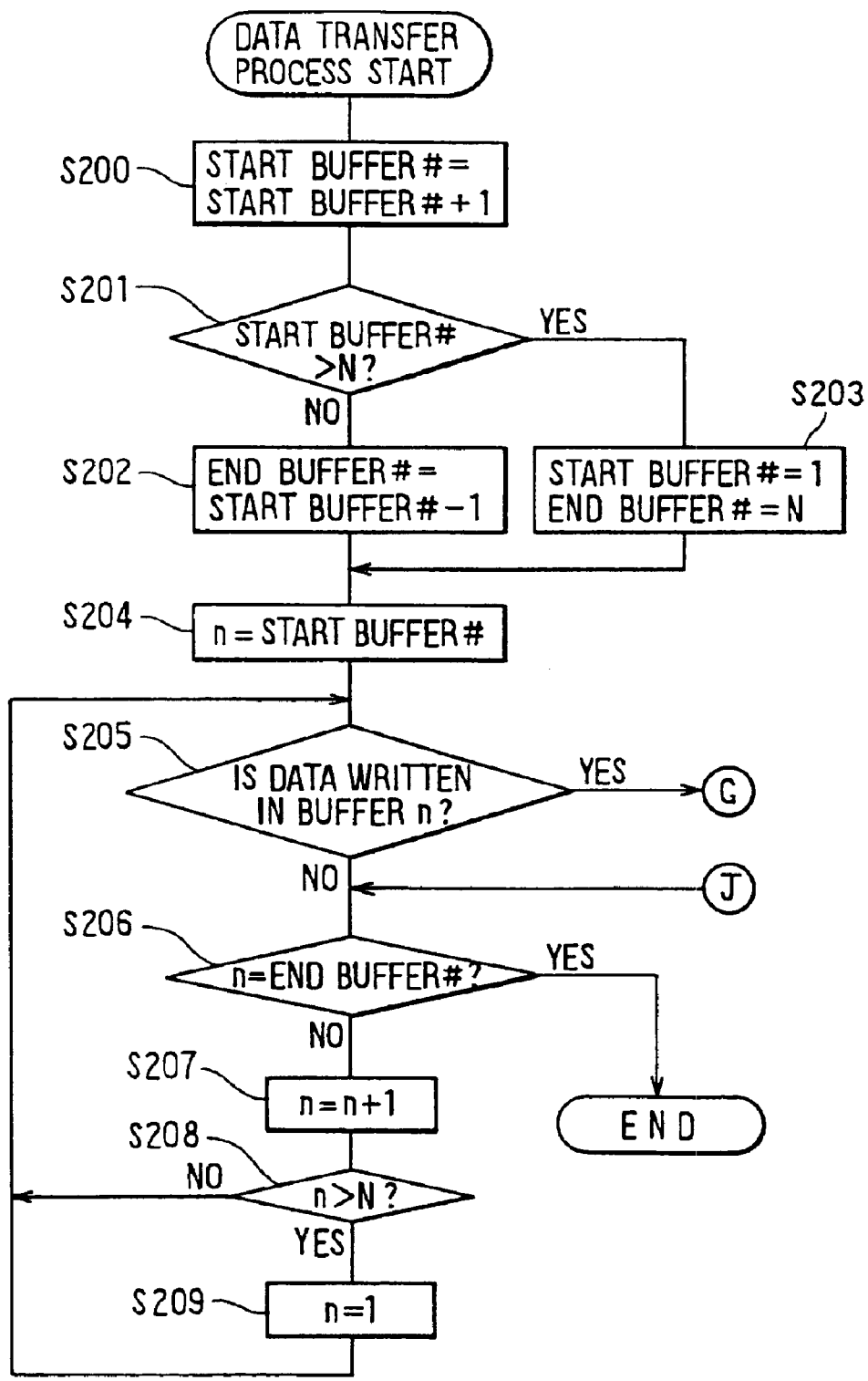
FIG. 23 is a flowchart illustrating the control executed in the data controller of the data repeater of the fourth embodiment.

FIG. 23 shows a data transfer process from the buffer group 43 to the sending buffers 421–423 executed by the data controller 44A of the data repeater 4A. At step S200, the data controller 44A increase the number of the start buffer number by 1, with respect to the last data transfer process. At the following step S201, the data controller 44A ascertains whether the start buffer number excesses N or not. When the start buffer number does not excess, the data controller 44A set the end buffer number as the start buffer number −1. In other words, the transfer process from the buffer group 43 to the sending buffers 421–423 including ascertaining of the data in the buffer 431 comes round at the buffer having one former number than the start buffer number.

The data controller 44A set the start buffer number as n at the following step S204, and ascertains whether the data is written in the buffer n at step S205. When the data has already written, the data controller 44A executes the transfer process regarding the buffer n, in which the data is written, by the same steps as those in FIGS. 19–21 to moves step S206. When the data is not written (step S205), the data controller 44A moves to step S206.

At step S206, the data controller 44A ascertains whether the n is the end buffer number or not. When the n is not the end buffer number, the data controller 44A executes step S205 and later steps after executing steps S207, S208, and continues the data transfer process regarding the buffer 431 having next serial number. Here, steps S207 and 5208 are process to update the n to the serial number of the buffer 431, which is to be ascertained at next time. At step S207, the n is increased by 1. At step S208, the data controller 44A ascertains whether the n is more than N or not. When the n is equal to or less than N, the data controller 44A returns to step S205, and ascertains the data in the buffer 431 having the increased n, that is, the next serial number. In this way, the n is increased to more than N step by step, however, the data controller 44A returns from step S208 to step S209 and returns to step S205 by setting the n to 1. This is because a next buffer ascertained after the buffer N is the buffer 1. In this way, the data controller 44A executes the data transfer process regarding all of N buffers 431.

In the data transfer process, since the data controller 44A shifts the start buffer number and the end buffer number every the search comes round, it can prevent a degree of delay in the data transfer from deviating among the MID. For example, when it is explained with reference to FIGS. 16, 17, the data to be transferred to the second multiplex communication line 22 is three; those are data V, Y, Z. The data V is kept in the buffer 1, the data Y is kept in the buffer 4, and the data Z is kept in the buffer 5. Therefore, in the data controller 44 of the third embodiment in which the existence of the data is always started from the buffer 1, when the data V transferred from the buffer 1 is written in the sending buffer 422, the data Y cannot be written (see step S113). Furthermore, when one of data V, Y is written in the sending buffer 422, the data Z cannot be written. Therefore, it is rather difficult to transfer the data Y to the sending buffer 422 compared to the data V, and to transfer the data Z to the sending buffer 422 compared to the data V, Y. Hence, the data may delay in the data repeater 4. On the contrary, according to the data controller 44A of this embodiment, since the order of ascertain of existence of the data is shifted step by step every the search comes round, the data can be uniformly transferred to the corresponding sending buffers 421–423 among the buffer 1–the buffer N. Furthermore, since the order of the ascertaining is not fixed, a time needed for the data repeating can be uniformed among the buffers.

Here, in the data transfer process, an initial value of the start buffer number at the starting up of the data repeater 4A may set one of 1 to N.

(Fifth embodiment)

Figures 24, 25A, 25B, 25C:
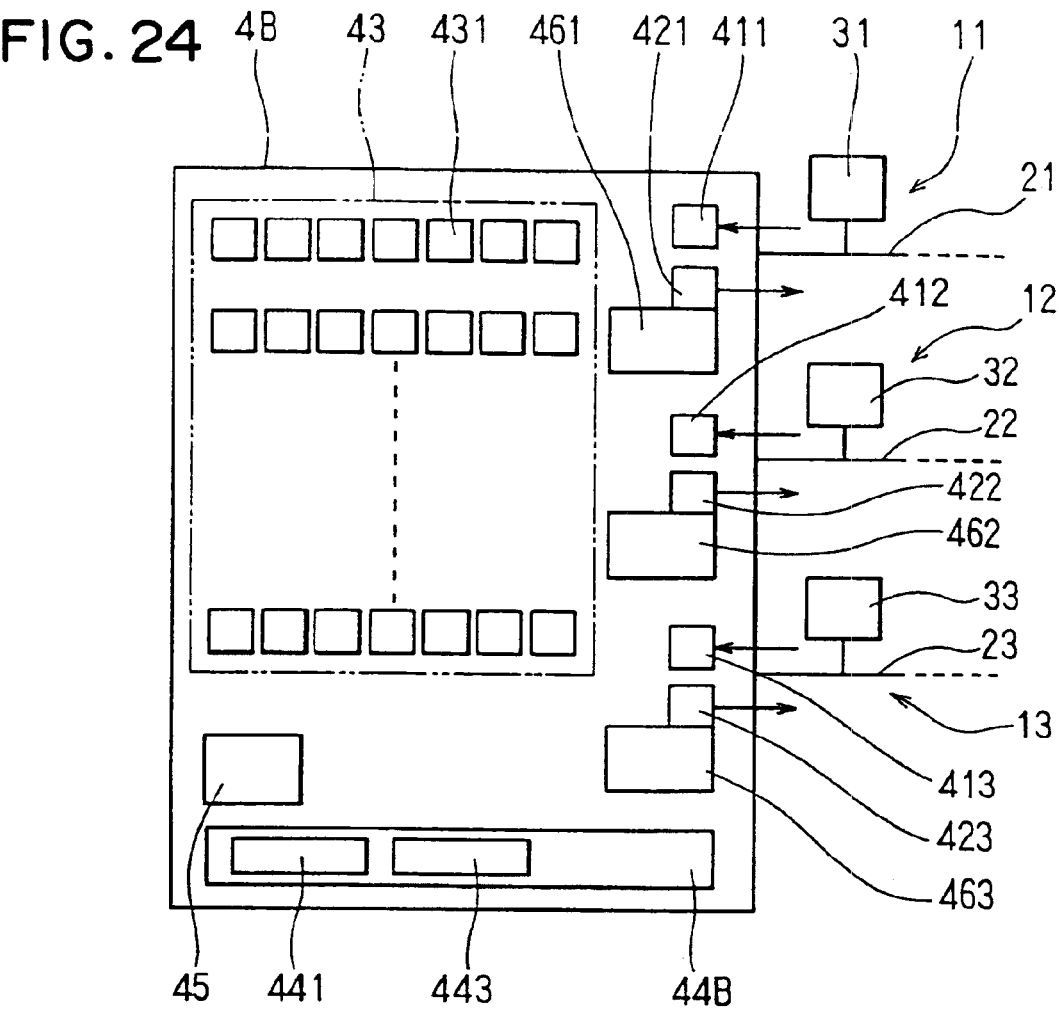
FIG. 24 is a diagram of a structure of a data repeater and a multiplex communication system of a fifth embodiment according to the present invention.
FIGS. 25A, 25B and 25C are diagrams illustrating relationships between sending orders and data types in a sending data list of the data repeater of the fifth embodiment.

FIG. 24 shows a data repeater and a multiplex communication system of a fifth embodiment according to the present invention. A difference between the third embodiment will be mainly explained.

A data repeater 4B is provided with sending data lists 461, 462, 463 for each of the multiplex communication lines 21–23. In the sending data lists 461–463, the types of data (MID) to be sent to each of the multiplex communication lines 21–23 are written in order of sending. FIG. 25A schematically shows the sending data lists 461–463. This figure shows the sending data list 462 for the second multiplex communication line 22 under an assuming that the transfer-address table 45 follows an example in FIG. 17. This figure shows that MID whose sending order is first is C8h; and the MID whose sending order is second is 01h. storage region for the sending data lists 461–463 are set in the RAM constituting the data repeater 4B.

The data controller 44B is provided with list update means 443 executed during the data transfer process from the receiving buffers 411–413 to the buffer group 43. The list update means adds information of MID of the received data to the sending data lists 461–463.

Figure 26:
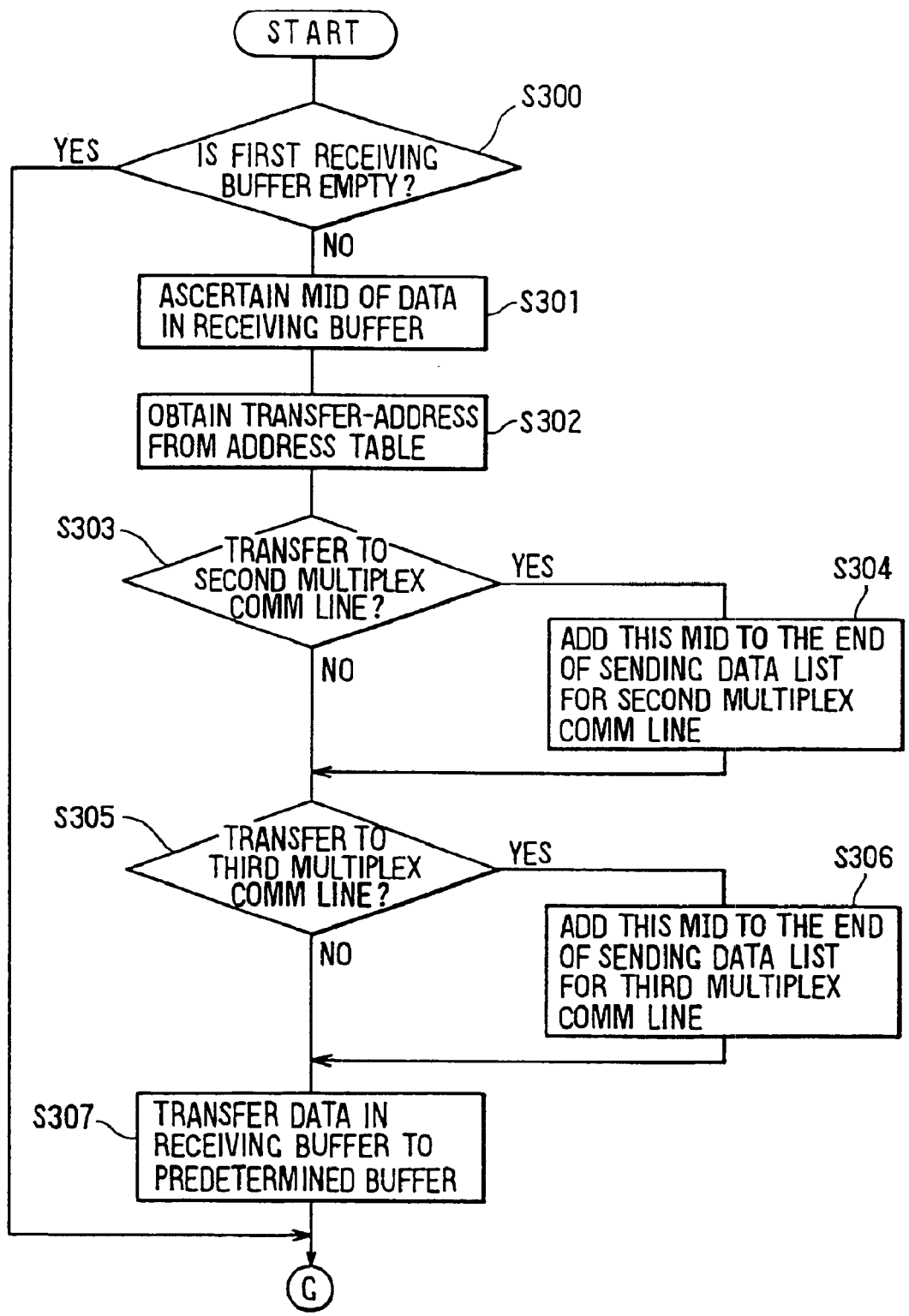
FIG. 26 is a first flowchart illustrating a control executed in a data controller of the data repeater of the fifth embodiment.
Figure 27:
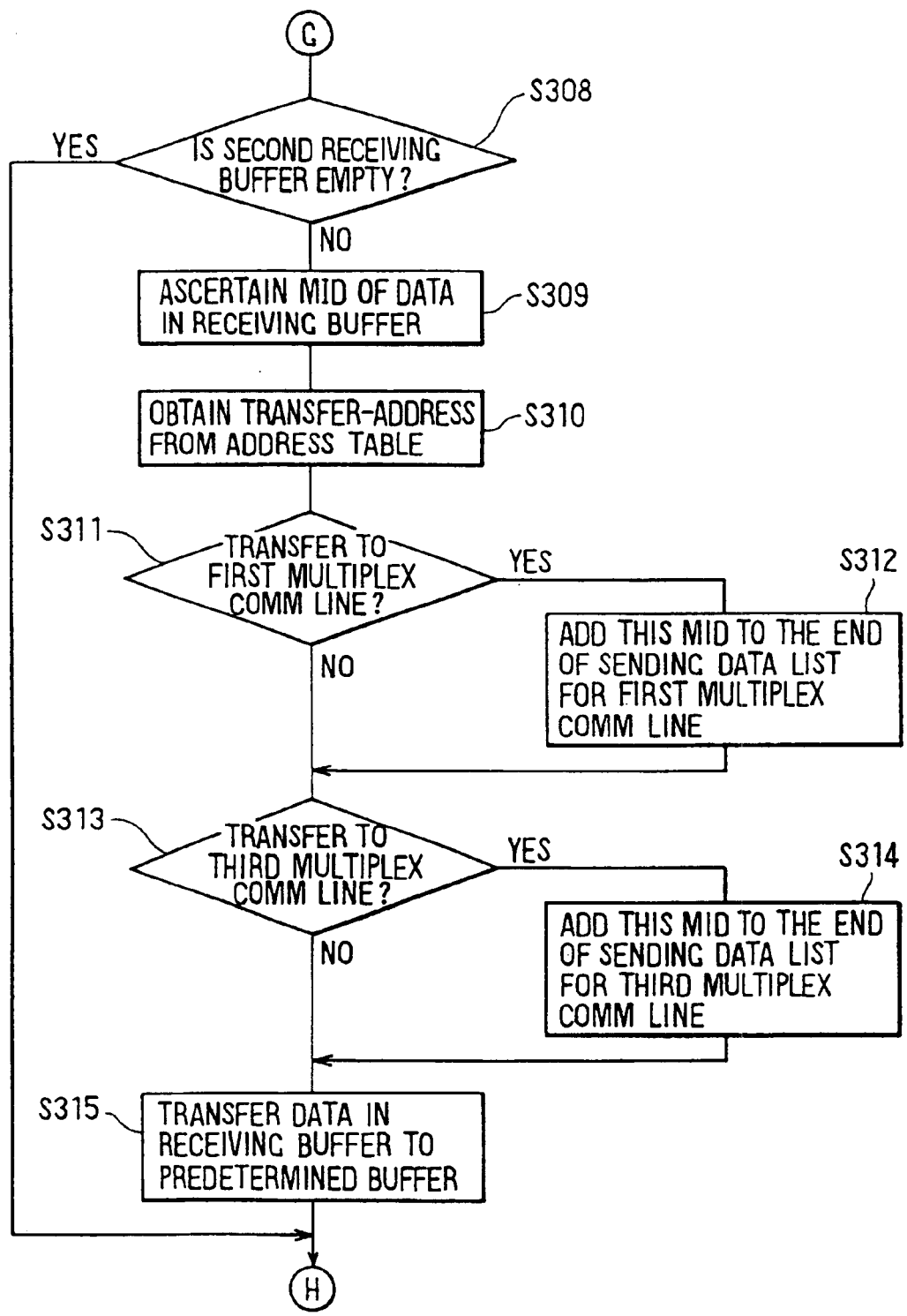
FIG. 27 is a second flowchart illustrating the control executed in the data controller of the data repeater of the fifth embodiment.
Figure 28:
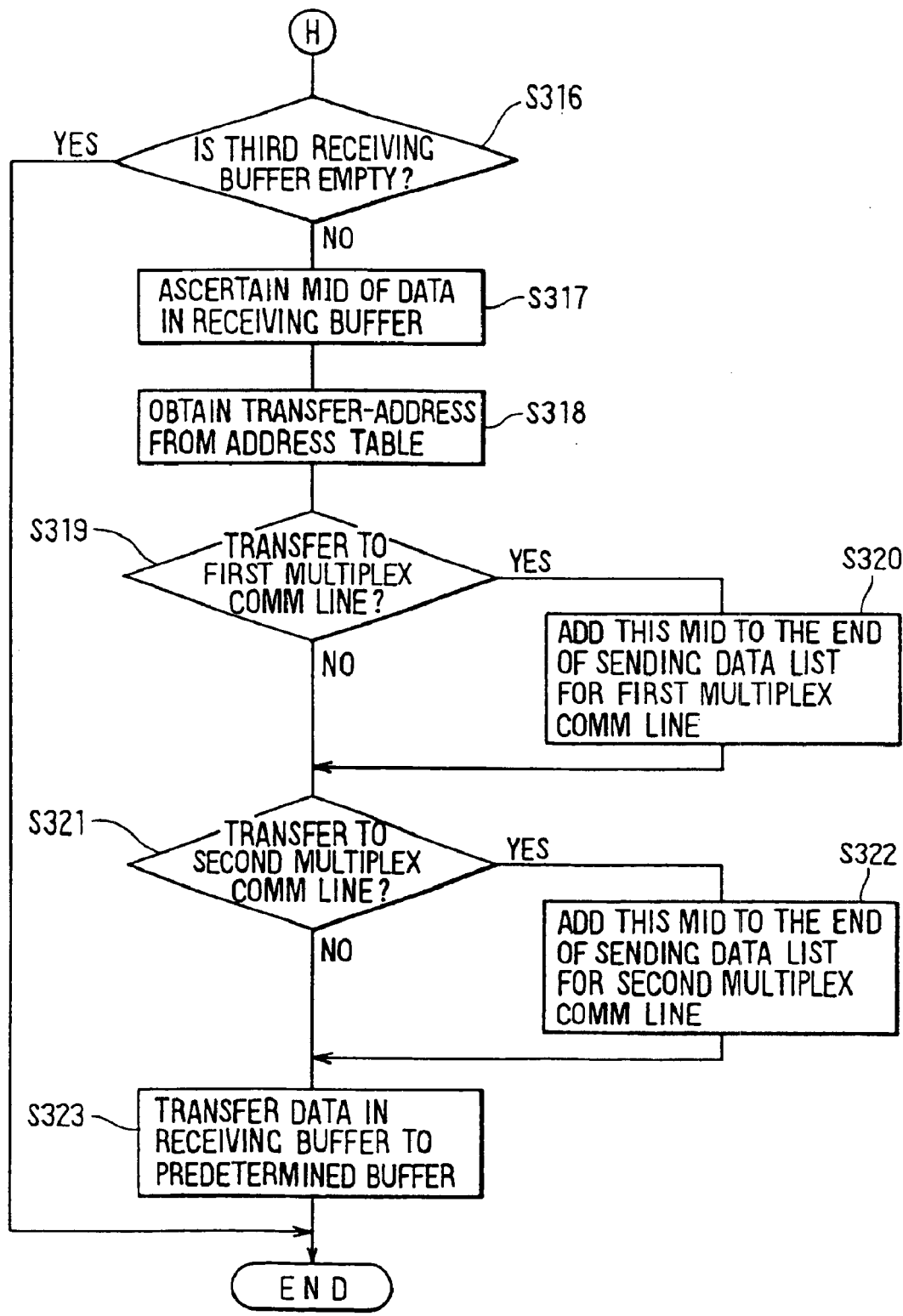
FIG. 28 is a third flowchart illustrating the control executed in the data controller of the data repeater of the fifth embodiment.
Figure 29:
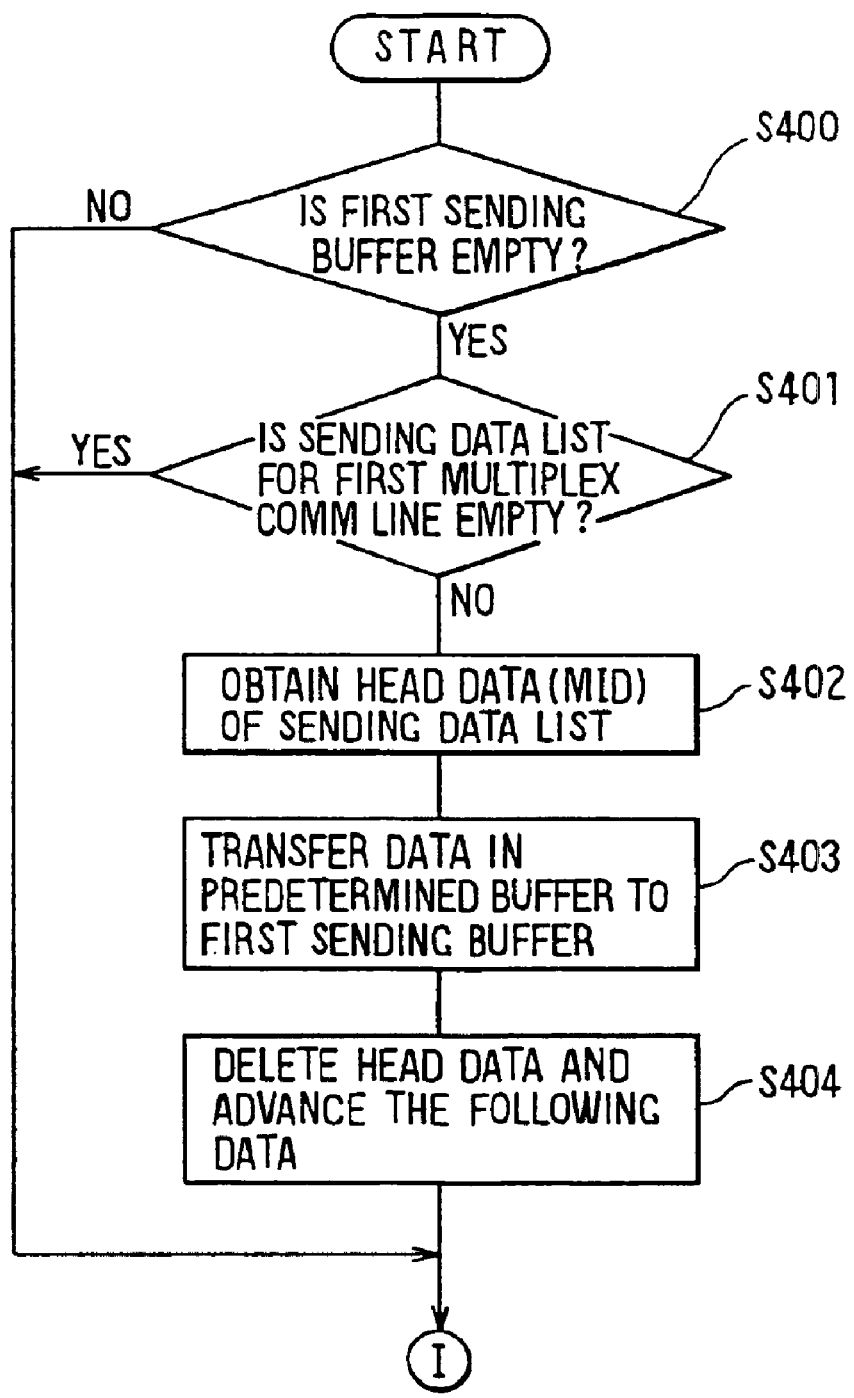
FIG. 29 is a fourth flowchart illustrating the control executed in the data controller of the data repeater of the fifth embodiment.
Figure 30:
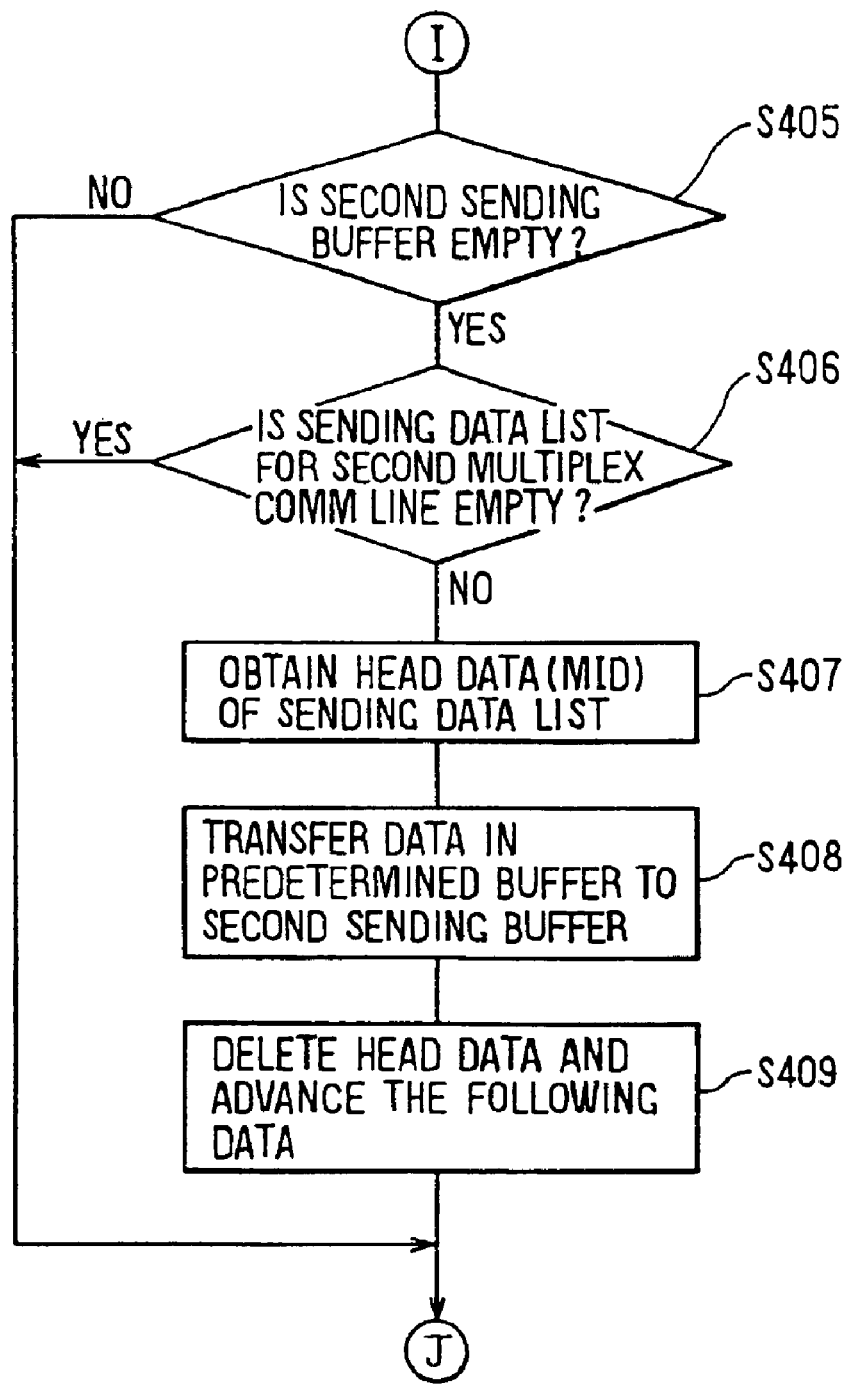
FIG. 30 is a fifth flowchart illustrating the control executed in the data controller of the data repeater of the fifth embodiment.
Figure 31:
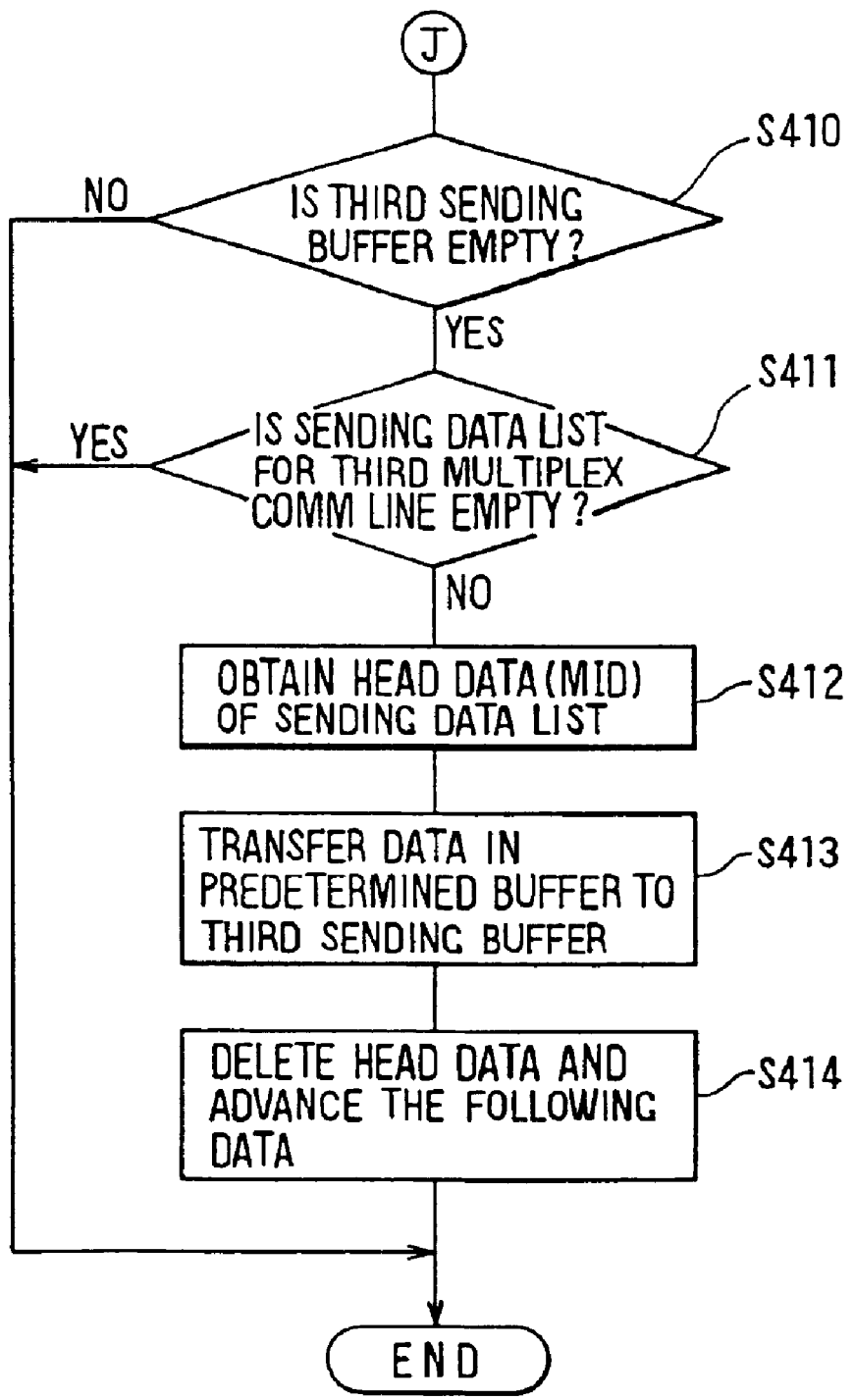
FIG. 31 is a sixth flowchart illustrating the control executed in the data controller of the data repeater of the fifth embodiment.

The data transfer process executed by the data controller 4B will be explained with reference to FIGS. 26, 27, 28, 29, 30 and 31. FIGS. 26–28 are the data transfer process from the receiving buffers 411–413 to the buffer group 43, and FIGS. 29–31 are the data transfer process from the buffer group 43 to the sending buffers 421–423.

The data transfer process to the buffer group 43 is divided into steps S300–S307 (FIG. 26) as the transfer process of the data received from the first multiplex communication line 21; steps S308–S315 (FIG. 27) as the transfer process of the data received from the second multiplex communication line 22; and steps S316–S323 (FIG. 28) as the transfer process of the data received from the third multiplex communication line 23. Here, steps S300, S301, S307, S308, S309, 5315, S316, S317 and 5323 are processes as the buffer assign means 441; and steps S301–S306, S309–S314 and S317–S322 are processed as the list update means 443.

At step S300, the data controller 44B ascertains whether the receiving buffer (first receiving buffer) 411 for the first multiplex communication line is empty of not. When it is not empty, the data controller 44B ascertains the MID of the received data in the receiving buffer 411 at step S301. Next, at step S302, the data controller 44B obtains the transfer-address of the received data based on the data transfer-address table.

At the following step S303, the data controller 44B ascertains whether there is the sending buffer 422 for the second multiplex communication line in the obtained transfer-address, and moves to step S304 when it is affirmed. At step S304, the data controller 44B adds the MID ascertained at step S301 to the end of the sending data list 462 for the second multiplex communication line 22, and moves to step S305. At step S305, the data controller 44B ascertains whether there is the sending buffer 423 for the third multiplex communication line in the obtained transfer-address, and moves to step S306 when it is affirmed. At step S306, the data controller 44B adds the MID ascertained at step. S301 to the end of the sending data list 463 for the third multiplex communication line 23, and moves to step S307. Here, when there is the same MID in the sending data lists 462, 463 in step 304 or 306, the data controller 44B adds the new MID and deletes the old MID, which have already written in the sending data lists 462, 463.

At step S307, the data controller 44B sends the data in the receiving buffer 411 for the first multiplex communication line to a predetermined buffer 431 corresponding the MID in the buffer group 43. After that, the data controller 44B moves to the transfer process (steps S308–S315) of data received from the second multiplex communication line 22. Here, when the receiving buffer 411 for the first multiplex communication line is empty at step S300, the data controller 44B skips the process of adding to the sending data lists 462, 463 for the second and the third multiplex communication line (steps S301–S306), and skips the data transfer process (step S307), and moves to the data transfer process for the data received from the second multiplex communication line 22.

At step s308, the data controller 44B ascertains whether the receiving buffer (second receiving buffer) 412 for the second multiplex communication line is empty of not. When it is not empty, the data controller 44B ascertains the MID of the received data in the receiving buffer 412 at step S309. Next, at step S310, the data controller 44B obtains the transfer-address of the received data based on the data transfer-address table.

At the following step S311, the data controller 44B ascertains whether there is the first multiplex communication line 21 in the obtained transfer-address, and moves to step S312 when it is affirmed. At step S312, the data controller 44B adds the MID ascertained at step S309 to the end of the sending data list 461 for the first multiplex communication line 21, and moves to step S313. At step S313, the data controller 44B ascertains whether there is the third multiplex communication line 23 in the obtained transfer-address, and moves to step S314 when it is affirmed. At step S314, the data controller 44B adds the MID ascertained at step S309 to the end of the sending data list 463 for the third multiplex communication line, and moves to step S315.

At step S315, the data controller 44B sends the data in the receiving buffer 412 for the second multiplex communication line to a predetermined buffer 431 corresponding the MID in the buffer group 43. After that, the data controller 44B moves to the transfer process (steps S316–S323) of data received from the third multiplex communication line 22. Here, when the receiving buffer 412 for the second multiplex communication line is empty at step S308, the data controller 44B skips the process of adding to the sending data lists 461, 463 for the first and the third multiplex communication line (steps S309–S314), and skips the data transfer process (step S315), and moves to the data transfer process for the data received from the third multiplex communication line 23.

At step S316, the data controller 44B ascertains whether the receiving buffer (third receiving buffer) 413 for the third multiplex communication line is empty of not. When it is not empty, the data controller 44B ascertains the MID of the received data in the receiving buffer 413 at step S317. Next, at step S318, the data controller 44B obtains the transfer-address of the received data based on the data transfer-address table.

At the following step S319, the data controller 44B ascertains whether there is the first multiplex communication line 21 in the obtained transfer-address, and moves to step S320 when it is affirmed. At step S320, the data controller 44B adds the MID ascertained at step S317 to the end of the sending data list 461 for the first multiplex communication line 21, and moves to step S321. At step S321, the data controller 44B ascertains whether there is the second multiplex communication line 22 in the obtained transfer-address, and moves to step S322 when it is affirmed. At step S322, the data controller 443 adds the MID ascertained at step S317 to the end of the sending data list 462 for the second multiplex communication line, and moves to step S323.

At step S323, the data controller 44B sends the data in the receiving buffer 413 for the third multiplex communication line to a predetermined buffer 431 corresponding the MID in the buffer group 43, so that all the data transfer process are completed. Here, when the receiving buffer 413 for the third multiplex communication line is empty at step S316, the data controller 44B skips the process of adding to the sending data lists 461, 462 for the first and the second multiplex communication line (steps S317–S322), and skips the data transfer process (step S323), and discontinues the transfer process.

Next, the data transfer process from the buffer 432 to the sending buffers 421–423 will be explained. Steps S400–S404 (FIG. 29) are the transfer process of the data from the buffer 431 to the sending buffer 421 for the first multiplex communication line; steps S405–S409 (FIG. 30) are the transfer process of the data to the sending buffer 422 for the second multiplex communication line; and steps S410–S414 (FIG. 31) are the transfer process of the data to the sending buffer 423 for the third multiplex communication line. At step S400, the data controller 44B ascertains whether the sending buffer 421 for the first multiplex communication line is empty or not. When it is empty, the data controller 44B ascertains whether the sending data list 461 for the first multiplex communication line is empty or not at step S401. When the sending data list 461 is not empty, that is, there is data to be sent from the buffer 431 to the sending buffer 421, the data controller 44B moves to step S402 to obtain a header MID of the sending data list at step S402. At the following step S403, the data controller 44B transfers the data in the buffer 431 corresponding to the obtained MID among the buffer group 43 to the sending buffer 421 for the first multiplex communication line. Next, the data controller 44B delete a header information of the sending data list 461, that is, the MID of data transferred at step S403, advances the following information of lower order, and moves to step S405. In this way, the data controller 44B transfers the data from the buffer 431 to the sending buffer 421 as soon as the sending buffer 421 become empty, in the order written in the sending data list 461. At there, the data wait for being sent to the first multiplex communication line 21. Here, when the data has already written in the sending buffer 421 at step S400, and when there is no data to be transferred in the sending data list at step S401, the data controller 44B moves to step S405 (FIG. 30).

At steps S405–S409 (FIG. 30), the data controller 44B executes the same process as steps S400–S404 regarding the sending buffer 422 for the second multiplex communication line, the buffer 431 keeping the data to be transferred the sending buffer 422, and the sending data list 462. That is, when the sending buffer 422 for the second multiplex communication line is empty (step S405) and there is an addition to the sending data list 462 for the second multiplex communication line (step S406), the data controller 44B reads a header MID of the sending data list 462 (step S407) and transfers the data in the buffer 431 corresponding the read MID to the sending buffer 422 (step S408). After that, the data controller 44B deletes the MID of the header data of in the sending data list 462, that is the MID of the transferred data so as to advance the lower order information (step S409).

At the following steps S410–S414 (FIG. 31), the data controller 44B executes the same process as steps S400–S404 regarding the sending buffer 423 for the third multiplex communication line, the buffer 431 keeping the data to be transferred the sending buffer 423, and the sending data list 463. That is, when the sending buffer 423 for the third multiplex communication line is empty (step S410) and there is an addition to the sending data list 463 for the third multiplex communication line (step S411), the data controller 44B reads a header MID of the sending data list 463 (step S412) and transfers the data in the buffer 431 corresponding the read MID to the sending buffer 423 (step S413). After that, the data controller 44B deletes the MID of the header data in the sending data list 463, that is the MID of the transferred data so as to advance the lower order information (step S414).

The data transfer process of the data controller 44B is set as described the above. In each of the sending data lists 461–463, the MID of each data to be sent to of the corresponding multiplex communication lines 21–23 is updated. The order in the sending data lists 461–463 is the same as the order the data received. For example, in the sending data list described as shown in FIG. 25A, the data controller transfers the data of C8h, whose sending order is the first, from the buffer group 431 to the sending buffer 422. Furthermore, when the data is sent to the second multiplex communication line 22, the data controller 44B deletes the C8h, whose sending order is the first, to advance 01h, whose sending order is the second, to become as shown in FIG. 25B. After that, when the data controller 44B receives the data whose MID=EBh, the data controller 44B newly writes EBh to the second order in the sending data list 462. As a result, the data to be sent becomes a waiting condition in the sending buffers 421–423 in the order the data is received, regardless of the serial number or the like of the buffer 431, for each of the multiplex communication lines 21–23. The data controller 44B can immediately repeat the data, because the type of data to be sent in the buffer 431 can obtained by the sending data lists 461–463 without ascertaining the existence of the data for all buffers 431. Furthermore, since the order of sending to each of the multiplex communication lines 21–23 is the same as the order of receiving of the data, all of the received data can be accurately sent without delaying.

(Sixth embodiment)

Figure 32:
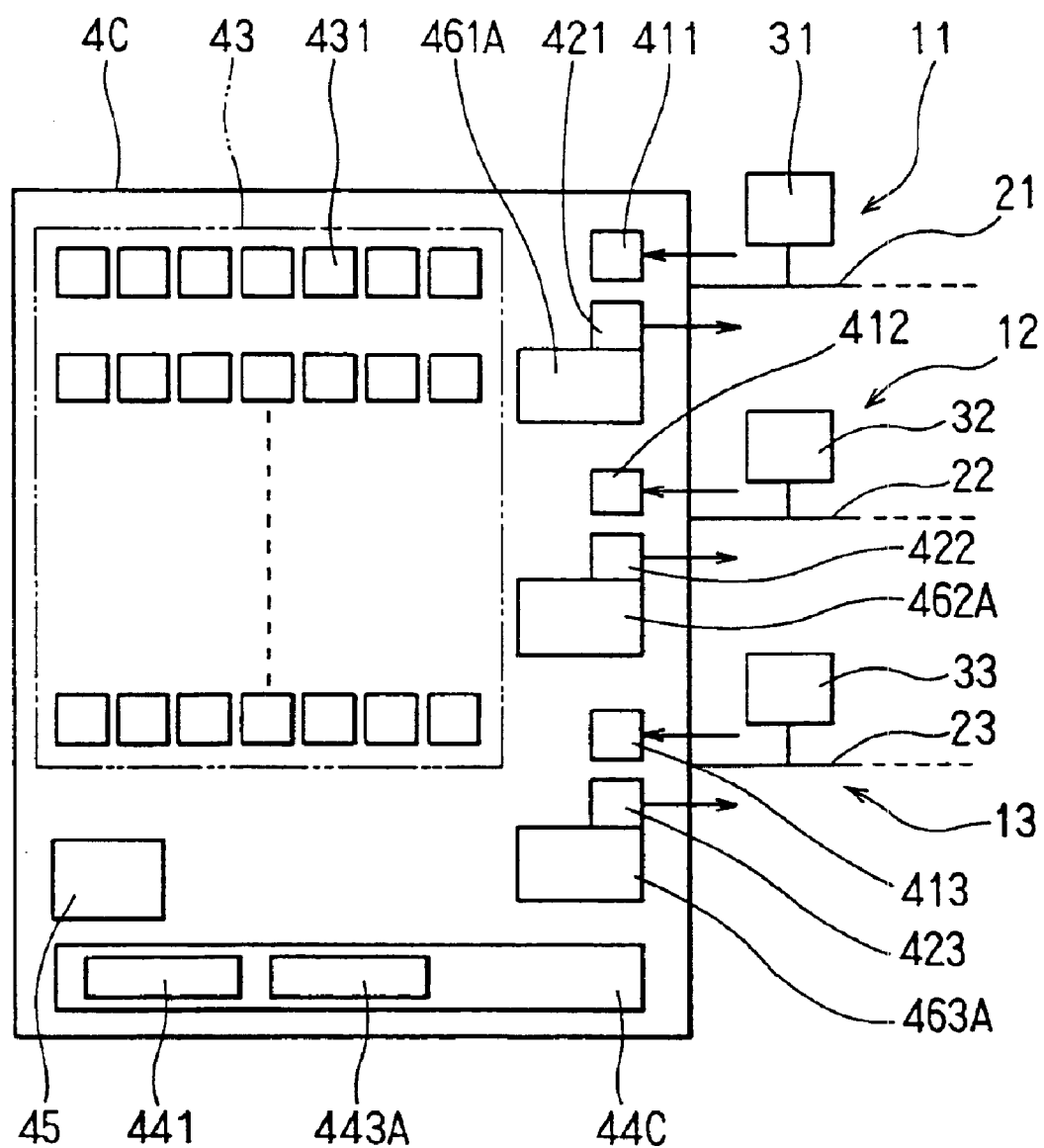
FIG. 32 is a diagram of a structure of a data repeater and a multiplex communication system of a sixth embodiment according to the present invention.

FIG. 32 shows a data repeater and a multiplex communication system of a sixth embodiment according to the present invention. A difference between each of the embodiments will be mainly explained. In the data repeater 4C of this embodiment, the sending data list and the data controller of the fifth embodiment are partly modified to the other sending data lists 461A, 462A, 463A, and another data controller 44C. The sending data list 461A–463A are capable of writing the other information in addition to the MID, and the data controller 44C is provided with list update means 443A, which is capable of changing the order in the sending data lists 461A–463A to another order, instead of the list update means of the fifth embodiment.

As shown in FIG. 33A, in addition to the MID, priorities of the MID are written in the sending data lists 461A–463A. In this example, the priority is variable from a minimum value of 0000b to a maximum value of 1111b.

The data controller 44C executes basically the same data transfer process shown in FIGS. 26–31. Processes of the list update means 443A as the different points are as follows. At step S301, the data controller 44C ascertains the MID of the data in the receiving buffer 411 and the priority. At step S309, the data controller 44C ascertains the MID of the data in the receiving buffer 412 and the priority. At step S317, the data controller 44C ascertains the MID of the data in the receiving buffer 413 and the priority. At steps S304, S306, S312, S314, S320 and S322, the data controller 44C adds the priorities as well as the MID. Here, the data controller 44C compares the ascertained priorities with the priorities already written in the sending data lists 461A–463A, and sorts the data so that the higher priority is moved to the higher sending order. This will be explained with reference to FIGS. 33A, 33B and 33C, for example. It is assumed that, as first, the sending list 462A is described as shown in FIG. 33A, and the data whose MID=EBh is newly received. The priority of this data is assumed to 1000b. The priority (1000b) of the data whose MID=EBh is lower than the priority (1101b) of the data whose MID=C8h, and is higher than the priority (0011b) of the data whose MID=01h. Hence, the data controller 44C adds the new data to the second place, so that the order of the data whose MID=01h is moved back and that the sending data list 462A is updated as shown in FIG. 33B. Here, when the priority of the received data whose MID=EBh is (0000b), this new data is added to the last place so that the sending data list 462A is updated as shown in FIG. 33C.

In this way, since the sending data lists 461A–463A are updated in the order of the priorities, the data controller 44C can immediately repeat the high priority data to a predetermined multiplex communication lines 21–23, so that it can prevent the data from delaying in the data repeater 4C.

(Seventh embodiment)

Figure 34:
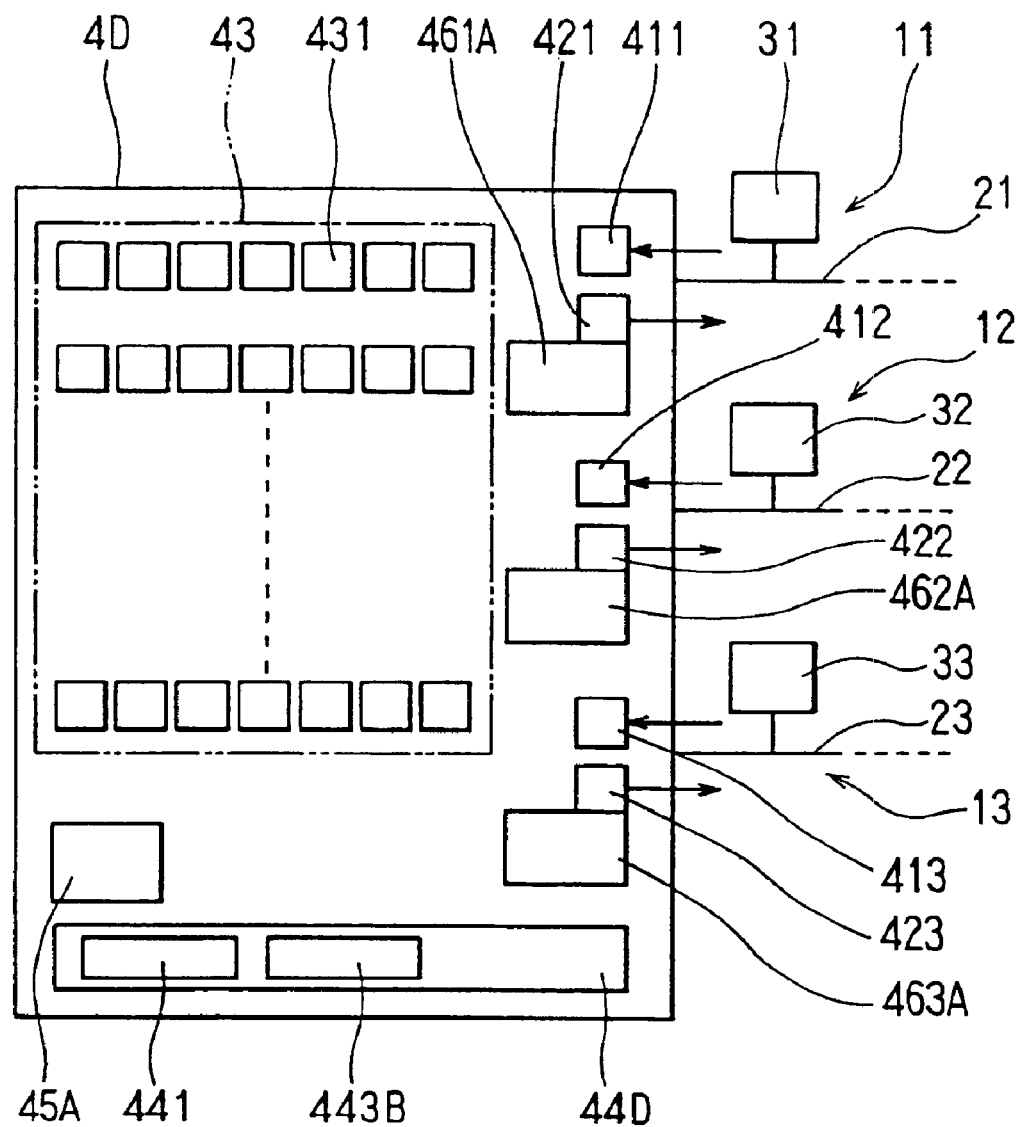
FIG. 34 is a diagram of a structure of a data repeater and a multiplex communication system of a seventh embodiment according to the present invention.

FIG. 34 shows a data repeater and a multiplex communication system of a seventh embodiment according to the present invention. A difference between each of the embodiments will be mainly explained. In the data repeater 4D of this embodiment, the transfer-address table and the data controller of the sixth embodiment are partly modified to the other transfer-address table 45A and another data controller 44D. The transfer-address table 45A as a priority table stores therein information of the priority as well as the transfer-address flag against every MID, as shown in FIG. 35. The transfer-address flag respectively corresponds the priority regarding every MID. This priority is previously determined independent of the priority included in the data (see FIG. 14). Furthermore, the data controller 44D is provided with list update means 443B, which is capable of changing the order in the sending data lists 461A–463A to another order, instead of the list update means of the sixth embodiment.

The data controller 44D executes basically the same data transfer process shown in FIGS. 26–31. Processes of the list update means 443B as the different points areas follows. At steps S302, S310, S318, the data controller 44D ascertains to which sending data lists 461A–463A is the information written, and ascertains information of the priority. At steps S304, S306, S312, S314, S320 and S322, the data controller 44D adds the MID and the priority. Here, the data controller 44D compares the ascertained priorities with the priorities already written in the sending data lists 461A–463A, and sorts the data so that the higher priority is moved to the higher sending order.

According to this embodiment, the higher priority the data has among the repeating data, the faster the data is transferred to the sending buffers 421–423, independent of the priority (PRI) of a BEAN protocol. For example, in the case where both of two data are transferred to both of the multiplex communication lines 22, 23, respectively, and when the data repeating to the second multiplex communication line 22 of one of the two data should be prioritized compared to that of another of the two data, and further when the data repeating to the third multiplex communication line 23 of the another of the two data should be prioritized compared to that of the one of the two data, the data controller 44D sets the priority of the one of the two data to high compared to that of the another of the two data regarding the data transfer to the sending buffer 422, and also sets the priority of the another of the two data to high compared to that of the one of the two data regarding the data transfer to the sending buffer 423. As a result, the one of the two data is repeated to the second multiplex communication line 22 faster, and the another of the two data is repeated to the third multiplex communication line 23 faster.

(Eighth embodiment)

Figure 36:
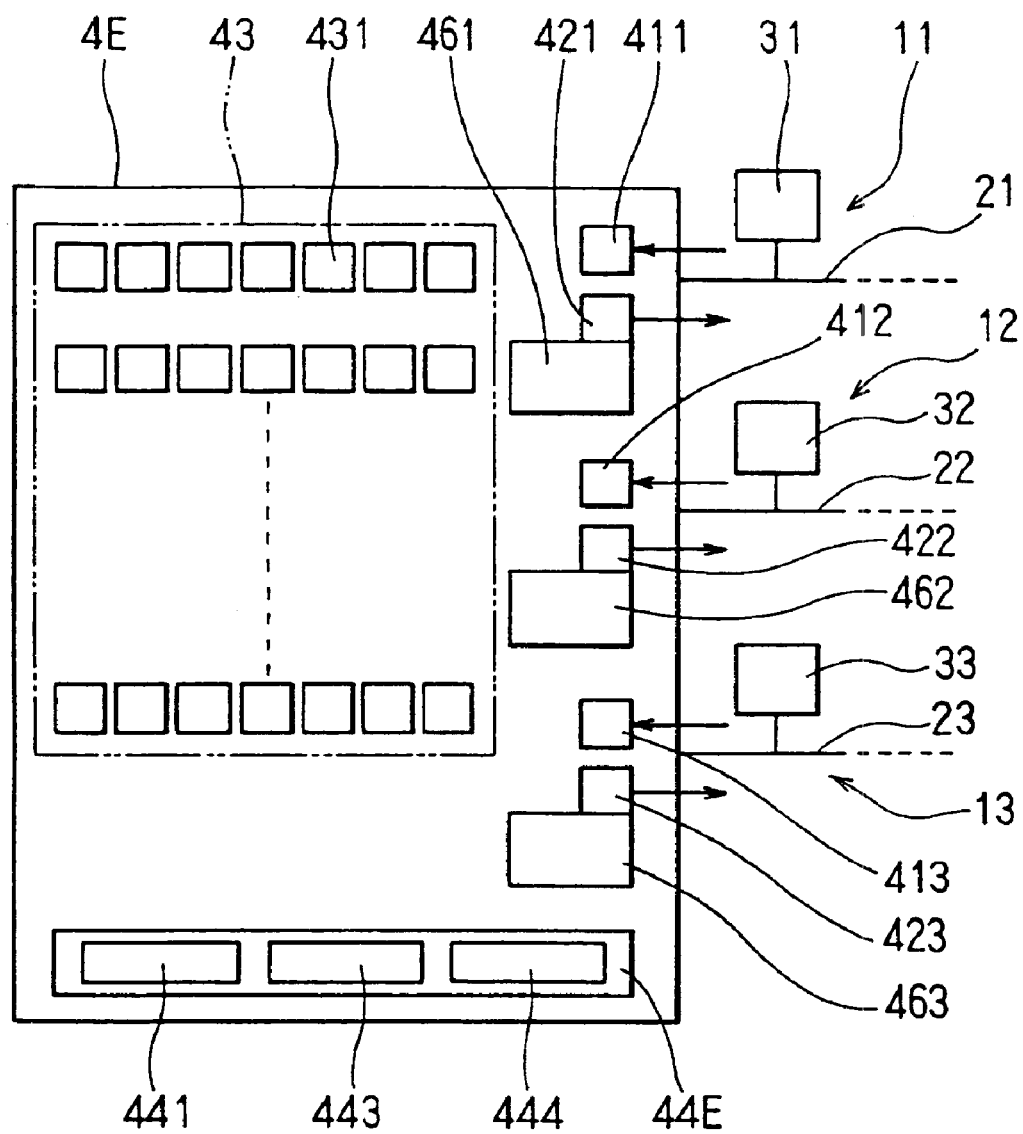
FIG. 36 is a diagram of a structure of a data repeater and a multiplex communication system of an eighth embodiment according to the present invention.
Figure 37:
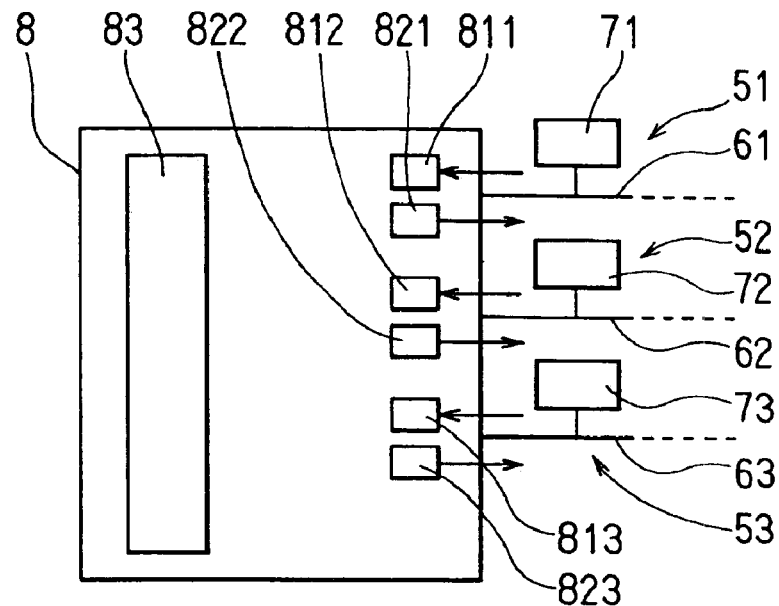
FIG. 37 is a diagram of a representative structure of a data repeater and a multiplex communication system according to prior art.
Figure 38:
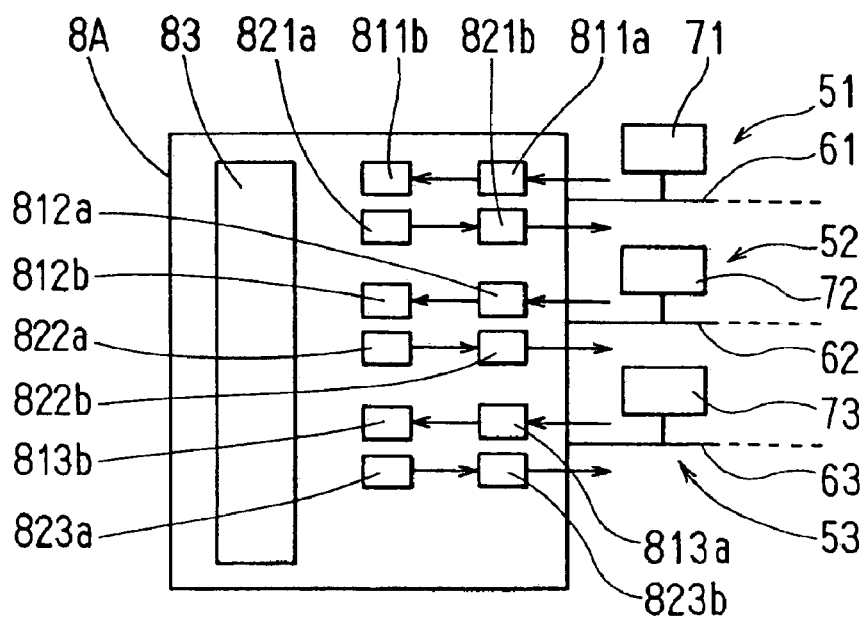
FIG. 38 is a diagram of another representative structure of a data repeater and a multiplex communication system according to prior art.

FIG. 36 shows a data repeater and a multiplex communication system of an eighth embodiment according to the present invention. A difference between each of the embodiments will be mainly explained. In the data repeater 4E of this embodiment, the data controller of the fifth embodiment is partly modified to another data controller 44E. The data controller 44E is basically the same as the data controller 44B of the fifth embodiment, but further has priority-reset means 444.

The data controller 44E executes basically the same data transfer process shown in FIGS. 26–31. Processes of the priority-reset means 444 as the different points are as follows. At steps S403, S408, S413, when the data controller 44E executes the transfer process from the buffer group 43 to the sending buffers 421–423, the data controller 44E transfers data to corresponding sending buffers 421–423 after resetting the priority of the data to (1111b), which is the highest priority. In the sending buffers 421–423, the data become a condition for waiting for being sent with resetting the priority to the highest one. As a result, the following effect can be achieved. That is, in the above-described embodiment, the repeating of the data, which is waiting for being sent, may delay in the sending buffers 421–423 because the multiplex communication lines 21–23 to be repeated are busy. According to this embodiment, since the data in the sending buffers 421–423 is set to the highest priority, this data has higher priority than that of the data to be sent from communication nodes 31–33, which belong communication groups 11–13 made up of the multiplex communication lines 21–23 through which the data is to be repeated. Therefore, the data transferred to the sending buffers 421–423 is immediately sent to the multiplex communication lines 21–23 through which the data is to be repeated.

Here, in this embodiment, the priority after resetting is (1111b), however, it may set another priority as long as the priority is the highest among each of the communication groups 11–13 through which the data is to be repeated. For example, when the highest priority among the priorities of the data sent from the communication node 32 belongs the second multiplex communication group 12 is (0011b), the priority of the data to be transferred to the second multiplex communication line 22 may be set to (0100b) or more.

Furthermore, the data controller 44E may reset the priority when the data is transferred from the receiving buffers 411–413 to the buffer group 43.

Here, in each of the embodiments, the buffer 431 is individually provided to every data type. However, it may assign plural buffers to one data type, so that the plural buffers are used as a stack type. Furthermore, the "types of data" means not only variations of the data classifying based on a structure or a form, but also variations of the data classifying based on contents (purposes) even if the data has the same structure and the same form.

What is claimed is:

1. A data repeater for repeating plural types of data and being interfaced with a plurality of multiplex communication lines through a receiving buffer and a sending buffer for transmitting data whose priority is previously set based on data type, comprising:

a data controller for selecting a certain multiplex communication line of the multiplex communication lines through which received data that is received from one of the multiplex communication lines other than the certain multiplex communication line is to be repeated and for transmitting the received data to the certain multiplex communication line, the data controller for preventing direct transmission of data between respective ones of the plurality of multiplex communication lines over which data is being transmitted and received by causing the received data to be temporally held from when the data is received by the receiving buffer through when the received data is transmitted from the receiving buffer to the sending buffer to when the data is transmitted by the sending buffer; and priority-reset means within the data controller for resetting a priority of the received data to a priority higher than an original priority of the received data when it is received, when the received data is transmitted from the receiving buffer to the sending buffer, wherein the priority-reset means resets the priority of the received data to a predetermined constant priority higher than original priorities of other data within the certain multiplex communication line.

2. A data repeater according to claim 1, wherein:

the priority-reset means is prospectively provided to each one of the plurality of multiplex communication lines through which the received data is to be repeated, and the priority-reset means resets the priority of the received data to a predetermined constant priority higher than original priorities of other data within the certain communication line.

3. A data repeater according to claim 1, wherein:

the predetermined constant priority to which the priority-reset means resets the priority of the received data is a maximum priority that the priority-reset means can reset.

4. A data repeater for repeating plural types of data and being interfaced with a plurality of multiplex communication lines through a receiving buffer and a sending buffer for transmitting data whose priority is previously set based on data type, comprising:

a data controller for selecting a certain multiplex communication line from the plurality of multiplex communication lines through which received data that is received from one of the plurality of multiplex communication lines other than the certain multiplex communication line is to be repeated and for transmitting the received data to the certain multiplex communication line, the data controller for preventing direct transmission of data between respective ones of the plurality of multiplex communication lines over which data is being transmitted and received by causing the received data to be temporally held from when the data is received by the receiving buffer through when the received data is transmitted from the receiving buffer to the sending buffer to when the data is transmitted by the sending buffer; and priority-reset means within the data controller for resetting the previously set priority of the received data to a priority higher than a predetermined priority before transmitting the received data when the received data is transmitted from the receiving buffer to the sending buffer, wherein the priority-reset means resets the priority of the received data to a predetermined constant priority higher than original priorities of other data within the certain multiplex communication line.

5. A data repeater according to claim 4, wherein:

the priority-reset means is prospectively provided to each of the plurality of multiplex communication lines through which the received data is to be repeated, and the priority-reset means resets the priority of the received data to a predetermined constant priority higher than priorities of other data within the certain communication line.

6. A data repeater according to claim 4, wherein:

the predetermined constant priority to which the priority-reset means resets the priority of the received data is a maximum priority that the priority-reset means can reset.

7. A multiplex communication system comprising:

a plurality of communication groups each having:
    a multiplex communication line for transmitting data whose priority is previously set based on data type; and
    a communication node connected to the multiplex communication line; and a data repeater interfaced with the multiplex communication lines of the communication groups through a receiving buffer and a sending buffer, for repeating plural types of data, comprising:
    a data controller for selecting a certain multiplex communication line of the multiplex communication lines through which received data that is received from a communication line of other than the certain multiplex communication line is to be repeated and for transmitting the received data to the certain multiplex communication line, the data controller having priority-reset means for resetting the previously set priority of the received data to a priority higher than a predetermined priority before transmitting the received data, the data controller for preventing direct transmission of data between respective ones of the plurality of multiplex communication lines over which data is being transmitted and received by causing the received data to be temporally held from when the data is received by the receiving buffer through when the received data is transmitted from the receiving buffer to the sending buffer to when the data is transmitted by the sending buffer;

wherein the priority-reset means resets the priority of the received data to a predetermined constant priority higher than original priorities of other data within the certain multiplex communication line.

* * * * *